United States Patent [19]
Walker et al.

[11] Patent Number: 6,088,686
[45] Date of Patent: Jul. 11, 2000

[54] SYSTEM AND METHOD TO PERFORMING ON-LINE CREDIT REVIEWS AND APPROVALS

[75] Inventors: Darcy Walker, Chicago, Ill.; Lawrence J. Sussman, New York, N.Y.; Mona Mayr, Naperville; Charles G. Dean, Jr., Villa Park, both of Ill.; Dennis Seib, St. Peters, Mo.; Richard Musci, Raleigh, N.C.; Glenn Marino, Cincinnati, Ohio

[73] Assignee: Citibank, N.A., New York, N.Y.

[21] Appl. No.: 08/758,770

[22] Filed: Dec. 3, 1996

Related U.S. Application Data

[60] Provisional application No. 60/008,538, Dec. 12, 1995.
[51] Int. Cl.[7] .................................................. G06F 15/163
[52] U.S. Cl. .............................. 705/38; 705/35; 705/39; 235/375; 235/379; 235/383
[58] Field of Search ................................ 705/38, 39, 35; 235/375, 379, 383

[56] References Cited

U.S. PATENT DOCUMENTS

| | | | |
|---|---|---|---|
| 5,239,462 | 8/1993 | Jones et al. . | |
| 5,576,951 | 11/1996 | Lockwood | 705/27 |
| 5,699,527 | 12/1997 | Davidson | 705/38 |
| 5,774,883 | 6/1998 | Andersen et al. | 705/38 |
| 5,778,178 | 7/1998 | Arunachalam | 709/203 |
| 5,870,721 | 2/1999 | Norris | 705/38 |
| 5,878,405 | 3/1999 | Grant et al. | 705/39 |

OTHER PUBLICATIONS

On–Line System Approves Loans While Customer Waits; Communications News; V31, N9, PP; 27; Sep. 27, 1994, especially first page, abstract, first paragraph, last paragraph.
Clancy, Gerry; Systems for Risk; Banker, v144, n822, p76(2), Aug. 1994, especially p. 3, lines 2–8.
Rusnak, Raymond I.; Consumer credit–scoring: are there lessons for commercial lenders?; Journal of Commercial Lending; v76, n11, p37(6), Jul. 1994, especially p. 2, lines 38–43.
Credit Applications being reviewed at front and back end for fraud detection; Credit Risk Management Report, v1, n6, Mar. 18, 1991; especially p. 1, lines 12–25; p. 2, lines 15–38.
Mortgage Ware Resource Guide; Interlinq Software Corporation, Release 5.4d, Nov. 1992, Chapter Qua, especially page Qua–3, Qua–9.
Colossi, Dawn; Credit where credit is due; Financial Technology Review; v1, n4, p54(3), May 1994, Abstract.
PCT International Search Report—PCT/US96/20289.

*Primary Examiner*—Thomas R. Peeso
*Attorney, Agent, or Firm*—Kilpatrick Stockton LLP; George T. Marcou

[57] ABSTRACT

A user-friendly on-line computerized system operates in real-time thus streamlining the processing of applications for products and services offered by a financial institution. The system automates many steps in the credit and liability review and approval process, performs background credit worthiness evaluations based upon a applicant's credit score, financial information and new or existing relationship with the financial institution, recommends to those applicants who exceed the initial criteria for credit consideration specific credit products with predetermined credit qualified offer amounts, and ensures the required operating (credit/liability) policies are appropriately completed. The system immediately analyzes an applicant's credit bureau history and automated credit scoring, and provides these results to the LBR. The system also takes into account information relating to the applicant's new or existing relationship with the financial institution, if any, into the credit decision request. This enables the system to provide applicants with an up-front conditional approval (based on systematic evaluation of credit bureau history, credit score, debt burden, and applicant's new or existing relationship deposits), subject to required verifications.

26 Claims, 70 Drawing Sheets

FIG. 2

| Status Code | Response Code | Credit Decision Message |
|---|---|---|
| RA | A | Recommended Approval |
| CA | A | A - Approved pending verification |
| CA | A | A - Approved for Upsell |
| CO | A | A - Counter Offer Approval |
| RT | - | Referred for review |
| RT | B | B - Referred for review |
| RT | C | C - Referred for Review |
| RT | D | D - Referred for Review |
| EN | - | Pending - In Process |
| DB | - | Pending - Debt Burden Review |
| MI | - | Missing Information |
| TE | - | Time expired |
| JD | - | Judgement Decline |
| SD | - | Score Decline |
| PD | - | Policy Decline |
| TD | - | Decline for Credit |
| AP | A | Approved - Pending Booking |
| AC | - | Customer Accepts |
| BK | - | Application Booked |
| NO | - | Rejected Downsell Offer |
| AW | - | Application Withdrawn |
| CN | - | Application Cancelled |

FIG. 3

```
********1*********2*********3*********4*********5*********6*********7*********8
 1 QPM1    - TERMID -          Product Maintenance - 1        --USER-- --DATE-- HH:MM
 2            Nfn              Dsp       Next                              Loc
 3 PRODUCT CODE:         Product Name:
 4 Description . :
 5 DATA ENTRY:
 6   Screen Seq:               Min/Max/Defaults:
 7                                           Amt/Limit    Trm    Amo    Rate/Var
 8                                    Min . . . :
 9   Error Corr Mode:                 Defaults :
10   Min Mths at Res:                 Max . . . :
11   Min Mths at Emp:        Profiles: Verification . . . . . . . :            Route to
12   Default Prty . . . :             AFS Rship Criteria:                      Route to
13 PROCESSING . :    Product Type:    Rship Assignment . . :           Product:
14   Unsecured/Secured Ind . . . . .           Rship Pricing . . . . . . . :           Interest Base Code:
15   Interest Type . . . . . . . . .           VIR Indicator . : _                     Auto-Deduct Ind:    -
16   Use Limit Assignment . . . . . :          Base Rate Code:
17   Assign Limit at Step . . . . . . . :  DC: _   CS1: _  CS2: _   Cr Limit Profile ID:
18   Prefill Verification Data . . . :         Generate ICS data:
19   Set-up Activity Code . . . . . . :                        Visa Bin#/MC ICA :
20   Acct# Generation Act Code . . . . :       HMDA Report Req . . : _   Agency ___   Dist #
21   Fraud Route to . . . . . . :  Post Rte:         Rptg ID              Tax ID
22   Duplicate Route to:              Inact Days Before Arch:      AP: _   TD _
23   Potential Liability Balance %:           Employee Application Route To:
24 PFKEYS: 1-HELP 2-MEN 3-OFF
********1*********2*********3*********4*********5*********6*********7*********8
```

FIG. 4A

| ROW | LABEL | ELEMENT NAME/DESCRIPTION | SIZE |
|---|---|---|---|
| 11 | VERIFICATION | NAU-PRM-VERIFICATION-PROFILE | X(07) |
| | | THE PROFILE ID FOR VERIFICATION PROCESSING. THIS FIELD IS OPTIONAL. IF ENTERED, MUST BE A VALID, EXISTING ID IN VERIFICATION PROFILE TABLE, AS SHOWN IN FIGURE 16. | |
| 11 | ROUTE TO | NAU-PRM-VERIFICATION-ROUTE-TO | X(03) |
| | | THE STATE TO WHICH THE APPLICATION IS AUTOMATICALLY ROUTED IF IT FAILS THE INCOME VERIFICATION PROCESSING. THIS FIELD IS REQUIRED WHEN A VERIFICATION PROFILE ID HAS BEEN ENTERED. IF ENTERED, MUST BE A VALID STATE FOR THE LOCATION. | |
| 12 | AFS RSHIP CRITERIA | NAU-PRM-ECM-RSHIP-PROFILE-ID | X(07) |
| | | THE PROFILE ID FOR AFS RELATIONSHIP PROCESSING. THIS FIELD IS OPTIONAL. IF ENTERED, MUST BE A VALID EXISTING ECM RELATIONSHIP PROFILE. | |
| 12 | ROUTE TO | NAU-PRM-ECM-ROUTE-TO-STATE | X(03) |
| | | THE STATE TO WHICH THE APPLICATION IS AUTOMATICALLY ROUTED IF IT ENCOUNTERS AN ERROR DURING THE AFS ON-LINE APPROVAL PROCESS. THIS FIELD IS OPTIONAL. IF ENTERED, MUST BE A VALID STATE FOR THE LOCATION. | |

FIG. 4B

| ROW | LABEL | ELEMENT NAME/DESCRIPTION | SIZE |
|---|---|---|---|
| 13 | PRODUCT TYPE | NAU-PRM-PRODUCT-TYPE-IND | X(01) |

THE PRODUCT TYPE INDICATOR. THIS FIELD IS OPTIONAL. IF ENTERED, MUST BE A VALID, EXISTING PRODUCT TYPE.

VALID VALUES ARE:

| | |
|---|---|
| A | BANKCARDS |
| B | CHECKING PLUS |
| C | READ CREDIT |
| D | INSTALLMENT LOAN |
| E | PREFERRED LINE |
| F | PREFERRED LOAN |
| G | EQUITY SOURCE ACCOUNT |
| H | FIRST MORTGAGE |
| I | SECOND MORTGAGE |
| J | DDA ACCOUNT |
| K | SAVINGS ACCOUNT |
| L | CHECK GUARANTEE |
| M | LIABILITY ACCOUNT |
| N | PREFERRED BANKCARD |
| O | PREFERRED VISA |
| P | PREFERRED MASTERCARD |
| Q | CLASSIC BANKCARD |
| R | CLASSIC VISA |
| S | CLASSIC MASTERCARD |
| T | FORD BANKCARD |
| U | FORD VISA |
| V | FORD MASTERCARD |
| W | AMERICAN ADVANTAGE CARD |
| X | AMERICAN ADVANTAGE VISA |
| Y | AMERICAN ADVANTAGE MASTERCARD |
| 0 | BUSINESS CHECKING PLUS |
| 1 | BUSINESS READY CREDIT |
| 2 | BUSINESS MONTHLY PAYMENT LOAN |
| 3 | BUSINESS PREFERRED LOAN |
| 4 | BUSINESS PAY LOAN |
| 5 | CHECKING PLUS LINE INCREASE |
| 6 | READY CREDIT LINE INCREASE |

FIG. 4C

| ROW | LABEL | ELEMENT NAME/DESCRIPTION | SIZE |
|---|---|---|---|
| 14 | RLSHIP PRICING | NAU-PRM-RLSHIP-PRICING-PROFILE | X(07) |
| | | THE PROFILE ID FOR RELATIONSHIP PRICING PROCESSING. THIS FIELD IS OPTIONAL. IF ENTERED, MUST BE A VALID, EXISTING RELATIONSHIP PROFILE. | |
| 14 | UNSECURED/SECURED IND | NAU-PRM-SECURED-PRODUCT-IND | X(01) |
| | | INDICATES WHETHER THE PRODUCT IS AN UNSECURED OR SECURED PRODUCT. THIS FIELD IS REQUIRED. VALID VALUES ARE "U"(UNSECURED) AND "S"(SECURED). | |
| 21 | POST RTE | NAU-PRM-POST-FRD-DUP-ROUTE-TO | X(03) |
| | | THE STATE TO WHICH THE APPLICATION IS AUTOMATICALLY ROUTED IF A FRAUD/DUPLICATE IS FOUND AFTER CREDIT BUREAU REQUEST PROCESSING IS PERFORMED. THIS FIELD IS OPTIONAL. IF ENTERED, MUST BE A VALID STATE FOR THE LOCATION. | |

FIG. 5

```
*********1*********2*********3*********4*********5*********6*********7*********8
 1 QPM3   - TERMID -           Product Maintenance - 3        --USER-- --DATE-- HH:MM
 2            Nfn                Dsp        Next                       Loc
 3 Product Code: ___
 4 CREDIT SCORING:
 5   First Pass Algorithm ID . : ___
 6     Approve Cutoff:  ___  Route To:  ___     Ltr ID: ___    Auto AP: _
 7     Investigate . . :  ___  Route To:  ___     Ltr ID: ___
 8     Reject Cutoff. :  ___  Route To:  ___     Ltr ID: ___    Auto TD: _
 9   Second Pass Algorithm ID: ___
10     Approve Cutoff:  ___         Disaster Pass Required: _  Ltr ID: ___    Auto AP: _
11       Final Approval Route to . . :  ___                    Ltr ID: ___
12       Rec Approval Route to . . :  ___                      Ltr ID: ___
13       Conditional Aprv Route To:  ___                       Ltr ID: ___
14       Counter-Offer Route To . :  ___                       Ltr ID: ___
15     Investigate . . . :  ___     Disaster Pass Required: _  Ltr ID: ___
16       Inv Reject - 1 Route To . . . . . :  ___              Ltr ID: ___
17       Inv Reject - 2 Route To . . . . . :  ___              Ltr ID: ___    Auto TD: _
18     Reject Cutoff . :  ___   Route To:  ___                 Ltr ID: ___
19 RECOMMEND LINE ASSIGNMENT:  From ___  To ___                Route To: ___
20   Debt Burden Review Range :  ___
21   Automated Exception Range:  ___ mths and Rqst Amt/Line Assignment >= ___
22      or   Self-Empl <  ___
23      or   Non-Residential Alien _
24 PFKEYS: 1-HELP 2-MEN 3-OFF
*********1*********2*********3*********4*********5*********6*********7*********8
```

FIG. 6A

| ROW | LABEL | ELEMENT NAME/DESCRIPTION | SIZE |
|---|---|---|---|
| 10 | DISASTER PASS REQUIRED | NAU-PRM-APRV-DISASTER-RQRD-IND<br><br>INDICATES WHETHER THE APPLICATION IS REQUIRED TO PASS DISASTER/POLICY SCREENING BEFORE IT IS CONSIDERED FOR APPROVAL. THIS FIELD IS REQUIRED WHEN AN APPROVE CUTOFF SCORE IS ENTERED. THIS FIELD DEFAULTS TO "N". | X(01) |
| 10 | AUTO AP | PRM-SECOND-PASS-AUTO-APPRV-IND<br><br>INDICATES WHETHER THE APPLICATION IS AUTOMATICALLY APPROVED IF THE SECOND CREDIT SCORE QUALIFIES THE APPLICATION FOR APPROVAL RECOMMENDATION. THIS FIELD IS REQUIRED AND DEFAULTS TO "N".<br><br>VALID VALUES ARE:<br>Y  YES, AUTOMATIC APPROVAL AND SET STATUS TO "AP"<br>R  RECOMMEND APPROVAL AND SET STATUS TO "RA"<br>C  CONDITIONAL APPROVAL AND SET STATUS TO "CA"<br>N  NO | X(01) |
| 12 | REC APPROVAL ROUTE TO | NAU-PRM-RA-ROUTE-TO-STATE<br><br>THE STATE TO WHICH THE APPLICATION IS AUTOMATICALLY ROUTED IF IT IS RECOMMENDED APPROVED. THIS FIELD IS OPTIONAL. IF ENTERED, MUST BE A VALID STATE FOR THE LOCATION. | X(03) |
| 12 | LTR ID | NAU-PRM-RA-LETTER-ID<br><br>THE LETTER WHICH IS AUTOMATICALLY SENT IF THE APPLICATION IS RECOMMENDED APPROVED. THIS FIELD IS OPTIONAL. IF ENTERED, MUST BE A VALID LETTER ID. | X(04) |

FIG. 6B

| ROW | LABEL | ELEMENT NAME/DESCRIPTION | SIZE |
|---|---|---|---|
| 13 | CONDITIONAL APPR ROUTE TO | NAU-PRM-CA-ROUTE-TO-STATE | X(03) |
|  |  | THE STATE TO WHICH THE APPLICATION IS AUTOMATICALLY ROUTED IF IT IS CONDITIONALLY APPROVED. THIS FIELD IS OPTIONAL. IF ENTERED, MUST BE A VALID STATE FOR THE LOCATION. |  |
| 13 | LTR ID | NAU-PRM-CA-LETTER-ID | X(04) |
|  |  | THE LETTER WHICH IS AUTOMATICALLY SENT IF THE APPLICATION IS CONDITIONALLY APPROVED. THIS FIELD IS OPTIONAL. IF ENTERED, MUST BE A VALID LETTER ID. |  |
| 14 | COUNTER-OFFER ROUTE TO | NAU-PRM-CO-ROUTE-TO-STATE | X(03) |
|  |  | THE STATE TO WHICH THE APPLICATION IS AUTOMATICALLY ROUTED IF IT IS COUNTER-OFFERED. THIS FIELD IS OPTIONAL. IF ENTERED, MUST BE A VALID STATE FOR THE LOCATION. |  |
| 14 | LTR ID | NAU-PRM-CO-LETTER-ID | X(04) |
|  |  | THE LETTER WHICH IS AUTOMATICALLY SENT IF THE APPLICATION IS COUNTER-OFFERED. THIS FIELD IS OPTIONAL. IF ENTERED, MUST BE A VALID LETTER ID. |  |
| 15 | INVESTIGATE | NAU-PRM-SECOND-PASS-INV-CUTOFF | 9(05) |
|  |  | THE CUTOFF VALUE FOR THE INVESTIGATE RANGE. THIS FIELD IS OPTIONAL. IF ENTERED, MUST BE A VALID NUMBER BETWEEN THE APPROVE AND REJECT CUTOFF VALUES. |  |

FIG. 6C

| ROW | LABEL | ELEMENT NAME/DESCRIPTION | SIZE |
|---|---|---|---|
| 15 | DISASTER PASS REQUIRED | NAU-PRM-INV-DISASTER-RQRD-IND<br><br>INDICATES WHETHER THE APPLICATION IS REQUIRED TO PASS ANY DISASTER/POLICY SCREENING BEFORE IT CAN BE QUALIFY FOR THE INVESTIGATE RECOMMENDATION. THIS FIELD IS REQUIRED WHEN AN INVESTIGATE CUTOFF SCORE IS ENTERED. THIS FIELD DEFAULTS TO "N".<br><br>VALID VALUES ARE:<br>Y   YES<br>N   NO | X(01) |
| 17 | INV REJECT 2 ROUTE TO | NAU-PRM-INV-RJCT-ROUTE-TO<br><br>THE STATE TO WHICH THE APPLICATION IS AUTOMATICALLY ROUTED IF IT FALLS WITHIN THE INVESTIGATE REJECT RANGE. THIS FIELD IS OPTIONAL. IF ENTERED, MUST BE A VALID STATE FOR THE LOCATION. | X(03) |
| 17 | LTR ID | NAU-PRM-INV-RJCT-LETTER-ID<br><br>THE LETTER WHICH IS AUTOMATICALLY SENT IF THE APPLICATION IS INVESTIGATE REJECTED. THIS FIELD IS OPTIONAL. IF ENTERED, MUST BE A VALID LETTER ID. | X(04) |
| 18 | AUTO TD | PRM-SECOND-PASS-AUTO-TD-IND<br><br>INDICATES WHETHER THE APPLICATION IS AUTOMATICALLY TURNED DOWN IF THE SECOND CREDIT SCORE QUALIFIES THE APPLICATION FOR TURNDOWN RECOMMENDATION. THIS FIELD IS REQUIRED AND DEFAULTS TO "N".<br><br>VALID VALUES ARE:<br>Y   YES, AUTOMATIC TURNDOWN AND SET STATUS TO "TD"<br>R   RECOMMEND TURNDOWN AND SET STATUS TO "RT"<br>N   NO | X(01) |

FIG. 6D

| ROW | LABEL | ELEMENT NAME/DESCRIPTION | SIZE |
|---|---|---|---|
| 20 | DEBT BURDEN REVIEW RANGE: FROM AND TO | NAU-PRM-LA-DB-REVIEW-FROM<br>NAU-PRM-LA-DB-REVIEW-TO<br><br>THE FROM AND TO LINE ASSIGNMENT VALUES FOR DEBT BURDEN REVIEW. THESE FIELDS ARE OPTIONAL. IF ENTERED, THEY MUST BE VALID NUMBERS. IF THE RECOMMENDED CREDIT LIMIT FALLS WITHIN THE SPECIFIED RANGE, IT IS ROUTED FOR DEBT BURDEN REVIEW. THESE FIELDS DEFAULT TO ALL 9S. | 9(09).99 |
| 21 | AUTOMATED EXCEPTION RANGE: FROM AND TO | NAU-PRM-LA-EXC-REVIEW-FROM<br>NAU-PRM-LA-EXC-REVIEW-TO<br><br>THE FROM AND TO LINE ASSIGNMENT VALUES FOR AUTOMATED EXCEPTION REVIEW. THESE FIELDS ARE OPTIONAL. IF ENTERED, THEY MUST BE VALID NUMBERS. IF THE RECOMMENDED CREDIT LIMIT FALLS WITHIN THE SPECIFIED RANGE, IT IS ROUTED FOR AUTOMATED EXCEPTION REVIEW. THESE FIELDS DEFAULT TO ALL 9S. | 9(09).99 |
| 21 | ROUTE TO | NAU-PRM-EXC-REVIEW-ROUTE-TO<br><br>THE STATE TO WHICH THE APPLICATION IS AUTOMATICALLY ROUTED IF THE RECOMMENDED CREDIT LIMIT FALLS WITHIN THE AUTOMATED EXCEPTION REVIEW RANGE OR THE APPLICANT'S MONTHS OF TENURE AND LINE ASSIGNMENT PASS THE EXCEPTION PARAMETERS. THIS FIELD IS REQUIRED WHEN THE AUTOMATED EXCEPTION REVIEW FROM AND TO FIELDS ARE SPECIFIED (NOT ALL 9S). IF ENTERED, MUST BE A VALID STATE FOR THE LOCATION. | X(03) |

FIG. 6E

| ROW | LABEL | ELEMENT NAME/DESCRIPTION | SIZE |
|---|---|---|---|
| 22 | MTHS | NAU-PRM-EXC-REVIEW-MTHS-TENURE | 9(04) |
| | | THE MINIMUM NUMBER OF MONTHS OF TENURE REQUIRED FOR SELF-EMPLOYED APPLICANTS. THIS FIELD IS OPTIONAL. IF ENTERED MUST BE A VALID NUMBER. IF THE APPLICANT HAS A RELATIONSHIP WITH THE BANK FOR LESS THAN THE REQUIRED NUMBER OF MONTHS, THE APPLICATION MAY BE ROUTED FOR AUTOMATED EXCEPTION REVIEW IF THE APPLICATION ALSO FAILS THE REQUIRED AR/LA AMOUNT. | |
| 22 | RQST AMT/LINE ASSIGNMENT >= | NAU-PRM-EXC-REVIEW-RQRD-RA-LA | 9(10) |
| | | THE MAXIMUM AMOUNT REQUESTED/LINE ASSIGNMENT FOR SELF-EMPLOYED APPLICANTS BEFORE THE APPLICANT IS ROUTED FOR AUTOMATED EXCEPTION REVIEW. THIS FIELD IS REQUIRED WHEN THE AUTOMATED EXCEPTION REVIEW MTHS OF TENURE HAS BEEN ENTERED. IF ENTERED MUST, BE A VALID NUMBER. | |
| 23 | NON-RESIDENTIAL ALIEN | NAU-PRM-EXC-REVIEW-NRA-IND | X(01) |
| | | INDICATES IF NON-RESIDENTIAL ALIEN APPLICANT IS INCLUDED FOR AUTOMATED EXCEPTION REVIEW. THIS FIELD IS REQUIRED WHEN THE AUTOMATED EXCEPTION REVIEW FROM AND TO FIELDS ARE ENTERED AND DEFAULTS TO "Y" (YES). VALID VALUES ARE  Y YES  N NO | |

FIG. 7

```
*********1*********2*********3*********4*********5*********6*********7*********8
 1 QPM4   - TERMID -           Product Maintenance - 4       --USER-- --DATE-- HH:MM
 2            Nfn _____        Dsp _____  Next _____                    Loc _____
 3 Product Code: _____
 4 User Exits:
 5    Application ID Generation: _____
 6    Financial Calculation....: _____
 7    SSN Search..............: _____
 8    Fraud Detection.........: _____
 9    Duplicate Detection.....: _____
10    Asset Validation........: _____
11    Liability Validation....: _____
12    New Account Set-up......: _____
13    Credit Limit Assignment.: _____
14    Collateral Validation...: _____
15    Account Number Generation: _____
16    Insurance and Fees......: _____
17    Debt Burden Calculation.: _____
18    Review Rule Checking....: _____
19    Accounting Sys Validation: _____
20    Relationship Profile....: _____
21    AFS Processing..........: _____
22
23
24 PFKEYS: 1-HELP 2-MEN 3-OFF
*********1*********2*********3*********4*********5*********6*********7*********8
```

FIG. 8

| ROW | LABEL | ELEMENT NAME/DESCRIPTION | SIZE |
|---|---|---|---|
| 20 | RELATIONSHIP PROFILE | NAU-PRM-RSHIP-PREFILL-UX-IND<br><br>INDICATES HOW RELATIONSHIP DATA IS PRE-FILLED FROM EXTERNAL DATABASES.<br><br>VALID VALUES ARE:<br><br>N   NONE (NO PREFILLING)<br>U   USER EXIT | X(01) |
| 20 | | NAU-PRM-RSHIP-PREFILL-UX-NAME<br><br>THE PROGRAM NAME OF THE USER EXIT MODULE WHICH PREFILLS THE APPLICANT'S RELATIONSHIP DATA. IF THE NAU-PRM-RSHIP-PREFILL-UX-IND='U' THEN THIS FIELD IS REQUIRED AND MUST CONTAIN A VALID PROGRAM NAME. IF IT EQUALS "N" THEN THIS FIELD MUST BE BLANK. | X(08) |
| 21 | AFS PROCESSING | NAU-PRM-ECM-UX-ACTION-IND<br><br>THE USER EXIT INDICATOR SPECIFIES IF AFS ON-LINE APPROVAL PROCESSING SHOULD BE PERFORMED.<br><br>VALID VALUES ARE:<br><br>N   NONE<br>U   USER EXIT | X(01) |
| 21 | | NAU-PRM-ECM-UX-PROG-NAME<br><br>THE PROGRAM NAME OF THE USER EXIT MODULE WHICH PERFORMS ON-LINE APPROVAL PROCESSING. IF THE NAU-PRM-ECM-ACTION-IND='U' THEN THIS FIELD IS REQUIRED AND MUST CONTAIN A VALID PROGRAM NAME. IF IT EQUALS "N" THEN THIS FIELD MUST BE BLANK. | X(08) |

FIG. 9

```
*********1*********2*********3*********4*********5*********6*********7*********8
 1 QPM8   - TERMID -         Product Maintenance - 8      --USER-- --DATE-- HH:MM
 2              Nfn          Dsp      Next                         Loc
 3 Product Code: ____
 4                              Response                              Response
 5   LIABILITY BALANCE:          Code          DEBT BURDEN:            Code
 6                  _____.___    __                       _____._     __
 7                  _____.___    __                       _____._     __
 8                  _____.___    __                       _____._     __
 9                  _____.___    __
10
11   PRE - SCREENING:                          DISASTER/POLICY SCREENING:
12      Below Minimum Income    __               Response Cd Processing?  _
13      Below Minimum Age       __
14
15   CREDIT - SCORING:
16      Hard Approval           __
17      Investigate Reject - 1  __
18      Investigate Reject - 2  __
19      Hard Reject - 3         __
20
21
22
23
24 KEYS: 1-HELP 2-MEN 3-OFF
*********1*********2*********3*********4*********5*********6*********7*********8
```

FIG. 10A

| ROW | LABEL | ELEMENT NAME/DESCRIPTION | SIZE |
|---|---|---|---|
| 03 | PRODUCT CODE | PRM-PRODUCT-TYPE-CODE | X(05) |
| | | THE ALPHANUMERIC CODE THAT DEFINES THE PRODUCT. THIS FIELD IS REQUIRED. | |
| 06 | LIABILITY BALANCE | NAU-PRM-LIAB-BALANCE-FROM-1<br>NAU-PRM-LIAB-BALANCE-TO-1 | 9(11).99 |
| | | THE RANGES OF LIABILITY BALANCE (RELATIONSHIP)AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD IS REQUIRED. IF ENTERED, MUST BE A VALID NUMBER AND IN LOGICAL SEQUENCE. | |
| 06 | RESPONSE CODE | NAU-PRM-LIAB-BALANCE-1-RC | X(01) |
| | | THE RESPONSE CODES FOR THE RANGES OF LIABILITY BALANCE (RELATIONSHIP AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED. | |
| | | VALID VALUES ARE: "A","B","C","D","E" | |
| 06 | DEBT BURDEN | NAU-PRM-DEBT-BURDEN-FROM-1<br>NAU-PRM-DEBT-BURDEN-TO-1 | 9(4).999 |
| | | THE RANGES OF DEBT PERCENTAGE. IF THE APPLICANT HAS A DEBT BURDEN PERCENTAGE WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD MUST ALSO BE ENTERED AND BE A VALID NUMBER IN A LOGICAL SEQUENCE. | |

FIG. 10B

| ROW | LABEL | ELEMENT NAME/DESCRIPTION | SIZE |
|---|---|---|---|
| 06 | RESPONSE CODE | NAU-PRM-DEBT-BURDEN-1-RC | X(01) |
| | | THE RESPONSE CODES FOR THE RANGES OF DEBT PERCENTAGES. IF THE APPLICANT HAS A DEBT PERCENTAGE WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED. | |
| | | VALID VALUES ARE: "A","B","C","D" | |
| 07 | LIABILITY BALANCE | NAU-PRM-LIAB-BALANCE-FROM-2<br>NAU-PRM-LIAB-BALANCE-TO-2 | 9(11).99 |
| | | THE RANGES OF LIABILITY BALANCE (RELATIONSHIP)AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD IS REQUIRED. IF ENTERED, MUST BE A VALID NUMBER AND IN LOGICAL SEQUENCE. | |
| 07 | RESPONSE CODE | NAU-PRM-LIAB-BALANCE-2-RC | X(01) |
| | | THE RESPONSE CODES FOR THE RANGES OF LIABILITY BALANCE (RELATIONSHIP AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED. | |
| | | VALID VALUES ARE: "A","B","C","D","E" | |

FIG. 10C

| ROW | LABEL | ELEMENT NAME/DESCRIPTION | SIZE |
|---|---|---|---|
| 07 | DEBT BURDEN | NAU-PRM-DEBT-BURDEN-FROM-2<br>NAU-PRM-DEBT-BURDEN-TO-2 | 9(4).999 |
| | | THE RANGES OF DEBT PERCENTAGE. IF THE APPLICANT HAS A DEBT BURDEN PERCENTAGE WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD MUST ALSO BE ENTERED AND BE A VALID NUMBER IN A LOGICAL SEQUENCE. | |
| 07 | RESPONSE CODE | NAU-PRM-DEBT-BURDEN-2-RC | X(01) |
| | | THE RESPONSE CODES FOR THE RANGES OF DEBT PERCENTAGES. IF THE APPLICANT HAS A DEBT PERCENTAGE WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED.<br><br>VALID VALUES ARE: "A","B","C","D" | |
| 08 | LIABILITY BALANCE | NAU-PRM-LIAB-BALANCE-FROM-3<br>NAU-PRM-LIAB-BALANCE-TO-3 | 9(11).99 |
| | | THE RANGES OF LIABILITY BALANCE (RELATIONSHIP) AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD IS REQUIRED. IF ENTERED, MUST BE A VALID NUMBER AND IN LOGICAL SEQUENCE. | |

FIG. 10D

| ROW | LABEL | ELEMENT NAME/DESCRIPTION | SIZE |
|---|---|---|---|
| 08 | RESPONSE CODE | NAU-PRM-LIAB-BALANCE-3-RC | X(01) |
| | | THE RESPONSE CODES FOR THE RANGES OF LIABILITY BALANCE (RELATIONSHIP AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED. | |
| | | VALID VALUES ARE: "A","B","C","D","E" | |
| 08 | DEBT BURDEN | NAU-PRM-DEBT-BURDEN-FROM-3<br>NAU-PRM-DEBT-BURDEN-TO-3 | 9(4).999 |
| | | THE RANGES OF DEBT PERCENTAGE. IF THE APPLICANT HAS A DEBT BURDEN PERCENTAGE WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD MUST ALSO BE ENTERED AND BE A VALID NUMBER IN A LOGICAL SEQUENCE. | |
| 08 | RESPONSE CODE | NAU-PRM-DEBT-BURDEN-3-RC | X(01) |
| | | THE RESPONSE CODES FOR THE RANGES OF DEBT PERCENTAGES. IF THE APPLICANT HAS A DEBT PERCENTAGE WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED. | |
| | | VALID VALUES ARE: "A","B","C","D" | |

FIG. 10E

| ROW | LABEL | ELEMENT NAME/DESCRIPTION | SIZE |
|---|---|---|---|
| 09 | LIABILITY BALANCE | NAU-PRM-LIAB-BALANCE-FROM-4<br>NAU-PRM-LIAB-BALANCE-TO-4 | 9(11).99 |
| | | THE RANGES OF LIABILITY BALANCE (RELATIONSHIP)AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD IS REQUIRED. IF ENTERED, MUST BE A VALID NUMBER AND IN LOGICAL SEQUENCE. | |
| 09 | RESPONSE CODE | NAU-PRM-LIAB-BALANCE-4-RC | X(01) |
| | | THE RESPONSE CODES FOR THE RANGES OF LIABILITY BALANCE (RELATIONSHIP AMOUNT). IF THE APPLICANT HAS A RELATIONSHIP AMOUNT WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED.<br><br>VALID VALUES ARE: "A","B","C","D","E" | |
| 09 | DEBT BURDEN | NAU-PRM-DEBT-BURDEN-FROM-4<br>NAU-PRM-DEBT-BURDEN-TO-4 | 9(4).999 |
| | | THE RANGES OF DEBT PERCENTAGE. IF THE APPLICANT HAS A DEBT BURDEN PERCENTAGE WITHIN A SPECIFIED RANGE, THE APPLICATION IS ASSIGNED THE CORRESPONDING RESPONSE CODE. THESE FIELDS ARE OPTIONAL. IF ONE IS ENTERED, THE CORRESPONDING FROM OR TO FIELD MUST ALSO BE ENTERED AND BE A VALID NUMBER IN A LOGICAL SEQUENCE. | |

FIG. 10F

| ROW | LABEL | ELEMENT NAME/DESCRIPTION | SIZE |
|---|---|---|---|
| 09 | RESPONSE CODE | NAU-PRM-DEBT-BURDEN-4-RC | X(01) |
| | | THE RESPONSE CODES FOR THE RANGES OF DEBT PERCENTAGES. IF THE APPLICANT HAS A DEBT PERCENTAGE WITHIN A SPECIFIED RANGE, THE APPLICATION IS ASSIGNED THE CORRESPONDING RESPONSE CODE. THIS FIELD IS REQUIRED WHEN THE CORRESPONDING FROM AND TO FIELDS ARE ENTERED | |
| | | VALID VALUES ARE: "A","B","C","D" | |
| 12 | BELOW MINIMUM INCOME | NAU-PRM-PRE-SCRN-MIN-INC-RC | X(01) |
| | | THE RESPONSE CODE FOR THE BELOW INCOME PRE-SCREENING RULE. IF THE APPLICANT FAILS THE MINIMUM INCOME RULE DURING PRE-SCREENING, THE APPLICATION IS ASSIGNED THE CORRESPONDING RESPONSE CODE. THE FIELD IS OPTIONAL. | |
| | | VALID VALUES ARE: "A","B","C","D" | |
| 12 | RESPONSE CD PROCESSING? | NAU-PRM-POLICY-RC-CHECK-IND | X(01) |
| | | SPECIFIES WHETHER RESPONSE CODE PROCESSING SHOULD BE PERFORMED FOR THE APPLICATION BASE ON DISASTER/POLICY SCREENING. THIS FIELD IS REQUIRED AND DEFAULTS TO"N". IF THIS FIELD IS SET TO "Y" (YES), THE APPLICATION IS ASSIGNED A RESPONSE CODE IF IT FAILS DISASTER/POLICY SCREENING. | |
| | | VALID VALUES ARE:<br>Y   YES<br>N   NO | |

FIG. 10G

| ROW | LABEL | ELEMENT NAME/DESCRIPTION | SIZE |
|-----|-------|--------------------------|------|
| 13 | BELOW MINIMUM AGE | NAU-PRM-PRE-SCRN-MIN-AGE-RC | X(01) |
| | | THE RESPONSE CODE FOR THE BELOW AGE PRE-SCREENING RULE. IF THE APPLICANT FALLS BELOW THE MINIMUM AGE CHECK DURING PRE-SCREENING, THE APPLICATION IS ASSIGNED THIS RESPONSE CODE. THE FIELD IS OPTIONAL. | |
| | | VALID VALUES ARE: "A","B","C","D" | |
| 16 | HARD APPROVAL | NAU-PRM-SCORING-APPROVE-RC | X(01) |
| | | THE RESPONSE CODE FOR THE HARD APPROVAL PRE-SCREENING CHECK. IF THE APPLICANT SCORES AT OR ABOVE THE APPROVED CUTOFF VALUE (SPECIFIED ON THE PM3 TABLE, FIGURE 5), THE APPLICATION IS ASSIGNED THIS RESPONSE CODE. THE FIELD IS OPTIONAL. | |
| | | VALID VALUES ARE: "A","B","C","D" | |
| 17 | INVESTIGATION REJECT-1 | NAU-PRM-SCORING-INV-APRV-RC | X(01) |
| | | THE RESPONSE CODE FOR INVESTIGATE REJECT 1 SCORE RANGE. IF THE APPLICANT SCORES WITHIN THE INVESTIGATE REJECT-1 RANGE (SPECIFIED ON PM3 TABLE, FIGURE 5), IT IS ASSIGNED THIS RESPONSE CODE. THE FIELD IS OPTIONAL. | |
| | | VALID VALUES ARE: "A","B","C","D" | |
| 18 | INVESTIGATION REJECT-2 | NAU-PRM-SCORING-INV-REJ-RC | X(01) |
| | | THE RESPONSE CODE FOR INVESTIGATE REJECT 2 SCORE RANGE. IF THE APPLICANT SCORES WITHIN THE INVESTIGATE REJECT-2 RANGE (SPECIFIED ON PM3 TABLE, FIGURE 5), IT IS ASSIGNED THIS RESPONSE CODE. THE FIELD IS OPTIONAL. | |
| | | VALID VALUES ARE: "A","B","C","D" | |

FIG. 10H

| ROW | LABEL | ELEMENT NAME/DESCRIPTION | SIZE |
|---|---|---|---|
| 19 | HARD REJECT-3 | NAU-PRM-SCORING-REJECT-RC | X(01) |
| | | THE RESPONSE CODE FOR HARD REJECT SCORE RANGE. IF THE APPLICANT SCORES AT OR BELOW THE TURNDOWN CUTOFF VALUE (SPECIFIED ON PM3 TABLE, FIGURE 5), IT IS ASSIGNED THIS RESPONSE CODE. THE FIELD IS OPTIONAL. | |
| | | VALID VALUES ARE: "A","B","C","D" | |

FIG. 11

```
*********1*********2*********3*********4*********5*********6*********7*********8
1 QRPP    - TERMID -       Relationship Pricing Profile        --USER--  --DATE--  HH:MM
2                   Nfn ____   Dsp ____   Next ____                      Loc ____
3 Relationship Pricing Profile: ____        Profile Name: ____
4                   Char: ____
5                   From: ____   To: ____
6 Char: ____
7 From: ____   To: ____
8                   ____
9                   ____
10                  ____
11                  ____
12                  ____
13                  ____
14                  ____
15                  ____
16                  ____
17                  ____
18                  ____
19                  ____
20                  ____
21                  ____
22                  ____
23                  ____
24 PFKEYS: 1-HELP 2-MEN 3-OFF
*********1*********2*********3*********4*********5*********6*********7*********8
```

FIG. 12

THE RELATIONSHIP CRITERIA CODES ARE UTILIZED TO PROVIDE THE LOOK UP VALUES FOR THE RELATIONSHIP PRICING PROFILE (RPP) (FIGURE 11). THE RPP IS A TWO DIMENSIONAL MATRIX WITH ROW AND COLUMN LOOK UP RANGES. THE THIRD VALUE OF THE MATRIX, BEING THE VALUE AT THE ROW AND COLUMN INTERSECTION, IDENTIFIES THE PRODUCT PROFILE (PPM) (FIGURE 14) THAT WILL BE USED TO PROVIDE PRICING OFFERS TO THE CUSTOMER.

CRITERIA CODES ARE IDENTIFIED AS FOLLOWS:

SINGLE CODES:
REC     RELATIONSHIP CODE
REA     RELATIONSHIP AMOUNT
REM     RELATIONSHIP MONTHS

CONCATENATED CODES:
RMA     RELATIONSHIP MONTHS AND AMOUNT
RCM     RELATIONSHIP CODE AND MONTHS
RCA     RELATIONSHIP CODE AND AMOUNT

CONCATENATED CODES ARE LEFT JUSTIFIED AND COMBINE TO A LENGTH OF 10 CHARACTERS. THE FIRST CHARACTER OF AN REC, THE LAST THREE CHARACTERS OF AN REM AND THE LAST SEVEN CHARACTERS OF AN REA ARE USED TO FORM A CONCATENATED CODE. THE FOLLOWING ARE EXAMPLES OF VALID CODE CONCATENATIONS:

RMA:     MONTHS = 123    AMOUNT = 6789    VALID CODE = 1230006789

RCM:     REL CODE = F    MONTHS = 123    VALID CODE = F123 FOLLOWED BY 6 SPACES

RCA:     REL CODE = G    AMOUNT = 1234567    VALID CODE = G1234567 FOLLOWED BY 2 SPACES

FIG. 13A

| ROW | LABEL | ELEMENT NAME/DESCRIPTION | SIZE |
|---|---|---|---|
| 03 | RELATIONSHIP PRICING PROFILE | NAU-RPP-PROFILE-ID | X(07) |
| | | THE PROFILE ID FOR RELATIONSHIP PRICING PROCESSING. THIS FIELD IS REQUIRED AND MUST BE A VALID RPP PROFILE ID | |
| 03 | PROFILE NAME | NAU-RPP-PROFILE-NAME | X(27) |
| | | THE FREE-FORM NAME OF THE RELATIONSHIP PRICING PROFILE. THIS FIELD IS OPTIONAL | |
| 04 | CHAR | NAU-RPP-CHARACTERISTIC-2 | X(03) |
| | | A CHARACTERISTIC OF THE APPLICANT USED FOR RELATIONSHIP PRICING PURPOSES. THIS FIELD IS OPTIONAL. | |
| | | VALID VALUES ARE: | |
| | | REC   RELATIONSHIP CODE<br>REA   RELATIONSHIP AMOUNT<br>REM   RELATIONSHIP MONTHS<br>RMA   RELATIONSHIP MONTHS AND AMOUNT<br>RCM   RELATIONSHIP CODE AND MONTHS<br>RCA   RELATIONSHIP CODE AND AMOUNT | |
| 05 | FROM | NAU-RPP-CHAR-2-RANGE-LO (1-5) | X(10) |
| 06 | TO | NAU-RPP-CHAR-2-RANGE-HI (1-5) | X(10) |
| | | RANGES FOR CHARACTERISTIC-2, THESE FIELDS ARE OPTIONAL, BUT SHOULD BE ENTERED IF CHARACTERISTIC-2 IS SPECIFIED. IF ENTERED, THE FROM RANGE MUST BE LESS THAN OR EQUAL TO THE CORRESPONDING TO RANGE. | |

FIG. 13B

| ROW | LABEL | ELEMENT NAME/DESCRIPTION | SIZE |
|---|---|---|---|
| 06 | CHAR | NAU-RPP-CHARACTERISTIC-1 | X(03) |

A CHARACTERISTIC OF THE APPLICANT USED FOR RELATIONSHIP PRICING PURPOSES. THIS FIELD IS OPTIONAL.

VALID VALUES ARE:

| | |
|---|---|
| REC | RELATIONSHIP CODE |
| REA | RELATIONSHIP AMOUNT |
| REM | RELATIONSHIP MONTHS |
| RMA | RELATIONSHIP MONTHS AND AMOUNT |
| RCM | RELATIONSHIP CODE AND MONTHS |
| RCA | RELATIONSHIP CODE AND AMOUNT |

| ROW | LABEL | ELEMENT NAME/DESCRIPTION | SIZE |
|---|---|---|---|
| 08-23 | FROM<br>TO | NAU-RPP-CHAR-1-RANKGE-LO (1-16)<br>NAU-RPP-CHAR-1-RANKGE-HI (1-16) | X(10)<br>X(10) |

UP TO SIXTEEN SETS OF RANGES FOR CHARACTERISTIC-1 MAY BE ENTERED. THESE FIELDS ARE OPTIONAL. IF ENTERED, THE FROM RANGE MUST BE LESS THAN OR EQUAL TO THE CORRESPONDING TO RANGE.

| ROW | LABEL | ELEMENT NAME/DESCRIPTION | SIZE |
|---|---|---|---|
| 08-23 | PRODUCT PROFILE ID | NAU-RPP-PRODUCT-PROFILE-ID(1-5)-(1-16) | X(10) |

THE PRODUCT PROFILE ID ASSIGNED TO AN APPLICATION WHICH MEETS THE CORRESPONDING CHARACTERISTIC-1 (ROW) AND CHARACTERISTIC-1 (COLUMN) RANGE. THE AMOUNT SPECIFIED IN THE FIELD WHERE THE ROW AND COLUMN MEET IS THE CREDIT LIMIT ASSIGNED. IF NO CHARACTERISTIC-2 IS SPECIFIED, THEN THE VALUE IN THE FIRST COLUMN OF THE QUALIFYING ROW IS ASSIGNED.

FIG. 14

```
*******1*********2*********3*********4*********5*********6*********7*********8
1 QPPM  - TERMID -            Product Profile                    --USER--  --DATE--  HH:MM
2             Nfn_____     Dsp ____ Next ____
3
4 Profile Name..:            Desc:
5 Effective Date :  99/99/99   to   99/99/99  Source ____ Code: ____        Loc ____
6 Prod Code(s)..:
7
8 Policy Profile:  N/A ____        as of:  99/99/99
9
10                            FINANCIAL PROFILE
11                 Amt / Limit      Trm  Amo    Rate        Ver
12 Cust Req Minimum..:  999999999    999  999   999.999    999.999
13 Cust Req Default..:  999999999    999  999   999.999    999.999
14 Cust Req Maximum..:  999999999    999  999   999.999    999.999
15 Approval Minimum..:  999999999    999  999   999.999    999.999
16 Approval Maximum..:  999999999    999  999   999.999    999.999
17 Qualifying........:                    999  999   999.999    999.999
18 Default Base Rate.:
19 Annual Fee .......:  99999999        Fee Comments/Desc:
20 Disclosure Profile:  N/A ____    as of:  99/99/99                Floor ..:  999.999
21 Insurance Profile:   N/A ____    as of:  99/99/99                Ceiling:   999.999
22 Fees Profile......:  N/A ____    as of:  99/99/99
23
24 PFKEYS: 1-HELP 2-MEN 3-OFF
*******1*********2*********3*********4*********5*********6*********7*********8
```

FIG. 15

| ROW | LABEL | ELEMENT NAME/DESCRIPTION | SIZE |
|---|---|---|---|
| 19 | ANNUAL FEE | PPM-ANNUAL-FEE-AMT | 9(05).99 |
| | | THE ANNUAL FEE FOR THE PRODUCT. THIS FIELD IS OPTIONAL. IF ENTERED, MUST BE A VALID NUMBER. | |
| 20 | FEE COMMENTS/DESC | PPM-ANNUAL-FEE-DESC | X(27) |
| | | A FREE-FORM DESCRIPTION OF THE ANNUAL FEE FOR THE PRODUCT. THIS FIELD IS OPTIONAL. | |

```
*********1*********2*********3*********4*********5*********6*********7*********8
1 QVRP   - TERMID -         Verification Profile           --USER-- --DATE-- HH:MM
2              Nfn _____  Dsp ____  Next ____                        Loc ____
3 Verification Profile ID: _____   Desc: _____
4 RECOMMENDED LIMIT                     VERIFICATION REQUIREMENTS
5  FROM          To
6  _____       _____     Employ.: _     EXC: Special Emp _ or RLT >= ____ mths
7                          Income: _      For :_  _  _  and RLT  <  ____ mths
8                          Phone.: _
9                          ID....: _
10 _____       _____     Employ.: _     EXC: Special Emp _ or RLT >= ____ mths
11                         Income: _      For :_  _  _  and RLT  <  ____ mths
12                         Phone.: _
13                         ID....: _
14 _____       _____     Employ.: _     EXC: Special Emp _ or RLT >= ____ mths
15                         Income: _      For :_  _  _  and RLT  <  ____ mths
16                         Phone.: _
17                         ID....: _
18 _____       _____     Employ.: _     EXC: Special Emp _ or RLT >= ____ mths
19                         Income: _      For :_  _  _  and RLT  <  ____ mths
20                         Phone.: _
21                         ID....: _
22
23 Income Verification:           Tolerance% ____
24 PFKEYS: 1-HELP 2-MEN 3-OFF
*********1*********2*********3*********4*********5*********6*********7*********8
```

| ROW | LABEL | ELEMENT NAME/DESCRIPTION | SIZE |
|---|---|---|---|
| 03 | VERIFICATION PROFILE ID | NAU-VRP-PROFILE-ID<br><br>THE PROFILE ID OF THE VERIFICATION PROFILE. THIS FIELD IS REQUIRED AND IF VALIDATED FOR ALPHANUMERIC. | X(07) |
| 03 | DESC | NAU-VRP-PROFILE-DESCRIPTION<br><br>THE DESCRIPTION OF THE VERIFICATION PROFILE. THIS FIELD IS OPTIONAL AND IS VALIDATED FOR ALPHANUMERIC. | X(30) |
| | | THE FOLLOWING 17 FIELDS OCCUR FOUR TIMES IN VERIFICATION PROFILE TABLE. | |
| 06, 10, 14, 18 | RECOMMENDED LIMIT FROM AND TO | NAU-VRP-REC-LIMIT-RANGE-FROM(1-4)<br>NAU-VRP-REC-LIMIT-RANGE-TO (1-4)<br><br>THE FROM AND TO VALUES FOR RECOMMENDED LIMIT. THESE FIELDS ARE OPTIONAL. IF ENTERED, MUST BE VALID NUMBERS. IF THE APPLICATION HAS A RECOMMENDED CREDIT LIMIT THAT FALLS INTO A PARTICULAR RANGE, IT IS REQUIRED TO PASS THE SPECIFIED VERIFICATION REQUIREMENTS. | 9(09).99<br>9(09).99 |
| 06, 10, 14, 18 | EMPLOY | NAU-VRP-EMPLOYMENT-IND (1-4)<br><br>INDICATES WHETHER EMPLOYMENT VERIFICATION IS REQUIRED FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS.<br><br>VALID VALUES ARE:<br><br>Y    YES<br>N    NO | X(01) |

FIG. 17B

| ROW | LABEL | ELEMENT NAME/ DESCRIPTION | SIZE |
|---|---|---|---|
| 06, 10, 14, 18 | | NAU-VRP-EMP-MISSING-INFO-CD (1-4)<br><br>THE MISSING EMPLOYMENT VERIFICATION CODE FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS. THIS FIELD IS NOT VALIDATED. | X(03) |
| 06, 10, 14, 18 | EXC: SPECIAL EMP | NAU-VRP-EXC-EMPLOYMENT-IND (1-4)<br><br>INDICATES WHETHER THE EXCEPTION OCCUPATION CODES RECOGNIZED AT THE BANK ARE EXCLUDED FROM EMPLOYMENT VERIFICATION. THIS FIELD IS REQUIRED WHEN VALUES ARE ENTERED IN THE CORRESPONDING RECOMMENDED LIMIT FROM AND TO FIELDS. THIS FIELD IS NOT VALIDATED.<br><br>VALID VALUES ARE:<br><br>Y    YES<br>N    NO<br><br>THE BANK RECOGNIZES THE FOLLOWING EXCEPTION OCCUPATION CODES:<br><br>K,1    SELF-EMPLOYED (PROFESSIONAL)<br>Z    SELF-EMPLOYED (SMALL BUSINESS)<br>H    HOMEMAKER<br>U    UNEMPLOYED (WITH INCOME)<br>2    UNEMPLOYED (WITHOUT INCOME)<br>R    RETIRED<br>S    STUDENT | X(01) |
| 06, 10, 14, 18 | OR RLT >=___MTHS | NAU-VRP-SELF-EMP-MIN-TENURE (1-4)<br><br>THE MINIMUM NUMBER OF MONTHS OF TENURE WITH THE BANK REQUIRED FOR EXCLUSION FROM EMPLOYMENT VERIFICATION. THIS FIELD IS OPTIONAL. IF ENTERED, MUST BE A VALID INTEGER. | 9(04) |

FIG. 17C

| ROW | LABEL | ELEMENT NAME/DESCRIPTION | SIZE |
|---|---|---|---|
| 07, 11, 15, 19 | INCOME | NAU-VRP-INCOME-IND (1-4) <br><br> INDICATES WHETHER INCOME VERIFICATION IS REQUIRED FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS. <br><br> VALID VALUES ARE: <br> Y    YES <br> N    NO | X(01) |
| 07 | | NAU-VRP-INC-MISSING-INFO-CD (1-4) <br><br> THE MISSING INCOME VERIFICATION FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS. THIS FIELD IS NOT VALIDATED. | X(03) |
| 07 11, 15, 19 | FOR | NAU-VRP-INCOME-OCC-CODES-1 (1-4) <br> NAU-VRP-INCOME-OCC-CODES-2 (1-4) <br> NAU-VRP-INCOME-OCC-CODES-3 (1-4) <br> NAU-VRP-INCOME-OCC-CODES-4 (1-4) <br><br> THE OCCUPATION CODES FOR WHICH INCOME VERIFICATION IS PERFORMED. AT LEAST ONE OCCUPATION CODE OF THE SELF-EMPLOYED MONTHS OF TENURE FIELD MUST BE ENTERED WHEN THE INCOME VERIFICATION INDICATOR IS SET TO "Y" (YES). SPECIAL GROUP CODES MAY ALSO BE ENTERED. | X(02) <br> X(02) <br> X(02) <br> X(02) |
| 07, 11, 15, 19 | RLT < ___ MTHS | NAU-VRP-INCOME-SELF-TENURE (1-4) <br><br> THE MAXIMUM NUMBER OF MONTHS OF TENURE WITH THE BANK REQUIRED FOR INCOME VERIFICATION. AT LEAST ONE OCCUPATION CODE OR THIS FIELD MUST BE ENTERED WHEN THE CORRESPONDING INCOME VERIFICATION INDICATOR IS SET TO "Y" (YES). IF ENTERED, MUST BE A VALID INTEGER. | 9(04) |

FIG. 17D

| ROW | LABEL | ELEMENT NAME/DESCRIPTION | SIZE |
|---|---|---|---|
| 08, 12, 16, 20 | PHONE | NAU-VRP-PHONE-IND (1-4)<br><br>INDICATES WHETHER PHONE VERIFICATION IS REQUIRED FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS. THIS FIELD IS NOT VALIDATED.<br><br>VALID VALUES ARE:<br>Y   YES<br>N   NO | X(01) |
| 08, 12, 16, 20 | | NAU-VRP-PHN-MISSING-INFO-CD (1-4)<br><br>THE MISSING PHONE VERIFICATION FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS. THIS FIELD IS NOT VALIDATED. | X(03) |
| 09, 13, 17, 21 | ID | NAU-VRP-IDENTIFICATION-IND (1-4)<br><br>INDICATES WHETHER ID VERIFICATION IS REQUIRED FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS. THIS FIELD IS NOT VALIDATED.<br><br>VALID VALUES ARE:<br>Y   YES<br>N   NO | X(01) |
| 09, 13, 17, 21 | | NAU-VRP-ID-MISSING-INFO-CD (1-4)<br><br>THE MISSING ID VERIFICATION FOR THE SPECIFIED RECOMMENDED LIMIT RANGE. THIS FIELD IS REQUIRED WHEN VALUES ARE ENTERED IN THE CORRESPONDING RECOMMENDED LIMIT FROM AND TO FIELDS. THIS FIELD IS NOT VALIDATED. | X(01) |

FIG. 17E

| ROW | LABEL | ELEMENT NAME/DESCRIPTION | SIZE |
|---|---|---|---|
| 23 | INCOME VERIFICATION TOLERANCE % | NAU-VRP-INCOME-TOLERANCE-PCT | 9(2).99 |
| | | THE MAXIMUM PERCENTAGE OF TOLERANCE FOR DEVIATION FROM THE EXPECTED INCOME FOR INCOME VERIFICATION. THIS FIELD IS REQUIRED WHEN INCOME VERIFICATION HAS BEEN SELECTED ON THE PROFILE FOR ANY OF THE RECOMMENDED LIMIT RANGES. IF ENTERED, MUST BE A VALID NUMBER. | |

```
*********1*********2*********3*********4*********5*********6*********7*********8
 1 QPII    - TERMID -         Product and Insurance Info     --USER-- --DATE-- HH:MM
 2              Nfn           Dsp           Next                         Loc
 3 WILSON, MR RICK B                        WILSON, MS SUSAN G           12345678 02/01/89
 4 889 MAIN ST                              415-555-1234                 DUP FRD NOTE
 5 ANYTOWN, CA 94598                        VISA $    8000               CBRNN EN
 6 Proc         Loc           G/L           Cls
 7 Status: EN PENDING - IN PROCESS
 8 Product Code                     Profile
 9    Type                                        Payment
10    Purpose                                     Minimum Pmt
11    Amount          Max DB Offer               BRT
12    Accept          Ceiling          Trm   Amo     Var
13    Rt    FI                                      Fq    BI
14 Insurance:
15    Type       Description        Y/N     Comments
16         _____    _____     _____
17         _____    _____     _____
18         _____    _____     _____
19         _____    _____     _____
20         _____    _____     _____
21         _____    _____     _____
22         _____    _____     _____
23                                                                         ─       ─
24 PFKEYS: 1-HELP 2-MEN 3-OFF 4-CBR 5-CUS 6-HIS 7-HTX 8-SUM 9-EMP 10-Next 11-NAM
*********1*********2*********3*********4*********5*********6*********7*********8
```

| ROW | LABEL | ELEMENT NAME/DESCRIPTION | SIZE |
|---|---|---|---|
| 12 | ACCEPT | NAU-APP-LOAN-AMOUNT-ACCEPTED | 9(09).99 |
| | | THE FINAL LOAN AMOUNT ACCEPTED BY THE CUSTOMER. THIS FIELD IS OPTIONAL AND MAY NOT BE ENTERED UNTIL AFTER DATA COMPLETE AND ONLY BY USERS WITH AUTHORITY TO CHANGE THE DECISIONED AMOUNT. IF ENTERED, MUST BE A VALID NUMBER AND BE LESS THAN OR EQUAL TO THE DECISIONED AMOUNT. | |
| 12 | MAX DB OFFER | NAU-APP-MAXIMUM-DB-OFFER | 9(09).99 |
| | | THE MAXIMUM DEBT BURDEN OFFER FOR THE CUSTOMER. THIS FIELD IS DISPLAYED ONLY WHEN THE MAXIMUM DEBT BURDENED OFFER LINE ASSIGNMENT PROCESS HAS BEEN PERFORMED. THIS FIELD IS PROTECTED AND SYSTEMATICALLY CALCULATED. | |

FIG. 20

```
*********1*********2*********3*********4*********5*********6*********7*********8
  1  QINC          - TERMID -       Income Information      --USER--  --DATE--  HH:MM
  2                 Nfn      Dsp      Next                            Loc
  3  WILSON, MR RICK B               WILSON, MS SUSAN G     12345678  02/01/89
  4  889 MAIN ST                     415-555-1234                     DUP FRD NOTE
  5  ANYTOWN, CA 94598               VISA  $    8000                  CBRNN XX
  6
  7  MONTHLY INCOME   PRIMARY  SECONDARY   TOTAL    Description / Comments
  8
  9  Base Employment Inc  9999999  9999999  99999999  XXXXXXXXXXXXXXXXXXXXXXXXXXXXXX
 10  Overtime             9999999  9999999  99999999  XXXXXXXXXXXXXXXXXXXXXXXXXXXXXX
 11  Bonuses              9999999  9999999  99999999  XXXXXXXXXXXXXXXXXXXXXXXXXXXXXX
 12  Commissions          9999999  9999999  99999999  XXXXXXXXXXXXXXXXXXXXXXXXXXXXXX
 13  Dividends/Interest   9999999  9999999  99999999  XXXXXXXXXXXXXXXXXXXXXXXXXXXXXX
 14  Net Rental Income    9999999  9999999  99999999  XXXXXXXXXXXXXXXXXXXXXXXXXXXXXX
 15  Other Income (1)     9999999  9999999  99999999  XXXXXXXXXXXXXXXXXXXXXXXXXXXXXX
 16  Other Income (2)     9999999  9999999  99999999  XXXXXXXXXXXXXXXXXXXXXXXXXXXXXX
 17  Other Income (3)     9999999  9999999  99999999  XXXXXXXXXXXXXXXXXXXXXXXXXXXXXX
 18  Other Income (4)     9999999  9999999  99999999  XXXXXXXXXXXXXXXXXXXXXXXXXXXXXX
 19       TOTAL          99999999 99999999 999999999
 20  Pri Verified Income:        Base  9999999  Other  9999999  TOTAL 99999999
 21  Sec Verified Income:        Base  9999999  Other  9999999  TOTAL 99999999
 22                                      _____            _____            _____
 23                                      _____            _____            _____
 24  PFKEYS: 1-HELP 2-MEN 3-OFF 4-CBR 5-CUS 6-HIS 7-HTX 8-SUM 9-EMP 10-Next 11-NAM
*********1*********2*********3*********4*********5*********6*********7*********8
```

FIG. 21

| ROW | LABEL | ELEMENT NAME/DESCRIPTION | SIZE |
|---|---|---|---|
| 21, 22 | BASE | NAU-APP-PRI-BASE-VER-INC<br>NAU-APP-SEC-BASE-VER-INC<br><br>THE VERIFIED BASE INCOME AMOUNT FOR PRIMARY AND SECONDARY APPLICANT. THESE FIELDS ARE OPTIONAL. IF ENTERED, MUST BE A VALID NUMBER. | 9(09).99<br>9(09).99 |
| 21, 22 | OTHER | NAU-APP-PRI-OTHER-VER-INC<br>NAU-APP-SEC-OTHER-VER-INC<br><br>THE VERIFIED OTHER INCOME AMOUNT FOR PRIMARY AND SECONDARY APPLICANT. THESE FIELDS ARE OPTIONAL. IF ENTERED, MUST BE A VALID NUMBER. | 9(09).99<br>9(09).99 |
| 21, 22 | TOTAL | NAU-APP-PRI-TOT-VERIFIED-INC<br>NAU-APP-SEC-TOT-VERIFIED-INC<br><br>THE TOTAL VERIFIED INCOME AMOUNT FOR PRIMARY AND SECONDARY APPLICANT. THESE FIELDS ARE PROTECTED AND ARE THE SUM OF THE CORRESPONDING VERIFIED BASE AND OTHER INCOME AMOUNTS. | 9(09).99<br>9(09).99 |

FIG. 22

```
*********1*********2*********3*********4*********5*********6*********7*********8
 1 QPM9    - TERMID -             Product Maintenance - 9        -- USER -- -- DATE -- HH:MM
 2              Nfn____            Dsp____ Next____                      Loc____
 3 Product Code: ____
 4
 5 CUSTOMER ASSESSMENT FACILITY
 6    Access    Indicator: _
 7
 8 CUSTOMER INFORMATION FILE:
 9    Max Days to Store Booked Loan Info ......:  EMP____
10    Max Days to Use Verification Info ....:           INC____    PHN____   ID____
11    Max Days to Use Cr Qualification Offer :
12
13
14
15
16
17
18
19
20
21
22
23
24 PFKEYS: 1-HELP 5-MEN 3-OFF
*********1*********2*********3*********4*********5*********6*********7*********8
```

FIG. 23

| ROW | LABEL | ELEMENT NAME/DESCRIPTION | SIZE |
|---|---|---|---|
| 09 | MAX DAYS TO STORE BOOKED LOAN INFO: | NAU-PRM-MAX-DAYS-CAP-LOAN-INFO<br><br>THE MAXIMUM NUMBER OF DAYS A LOAN ENTRY REMAINS ON THE CUSTOMER INFORMATION RECORD AND CAN BE INCLUDED IN DEBT BURDEN ANALYSIS FOR A NEW CREDIT REQUEST. THIS FIELD IS NUMERIC AND IS INITIALIZED TO ZERO. IF ENTERED, MUST BE A VALID NUMBER. | 9(03) |
| 10 | MAX DAYS TO USE VERIFICATION INFO: INC | NAU-PRM-MAX-DAYS-CAP-INC-VERIF<br><br>THE MAXIMUM NUMBER OF DAYS THE INCOME VERIFICATION INFORMATION ON THE CUSTOMER INFORMATION RECORD REMAINS EFFECTIVE. THIS FIELD IS NUMERIC AND IS INITIALIZED TO ZERO. IF ENTERED, MUST BE A VALID NUMBER. | 9(03) |
| 10 | EMP | NAU-PRM-MAX-DAYS-CAP-EMF-VERIF<br><br>THE MAXIMUM NUMBER OF DAYS THE EMPLOYMENT VERIFICATION INFORMATION ON THE CUSTOMER INFORMATION RECORD REMAINS EFFECTIVE. THIS FIELD IS NUMERIC AND IS INITIALIZED TO ZERO. IF ENTERED, MUST BE A VALID NUMBER. | 9(03) |
| 10 | PHN | NAU-PRM-MAX-DAYS-CAP-PHN-VERIF<br><br>THE MAXIMUM NUMBER OF DAYS THE PHONE VERIFICATION INFORMATION ON THE CUSTOMER INFORMATION RECORD REMAINS EFFECTIVE. THIS FIELD IS NUMERIC AND IS INITIALIZED TO ZERO. IF ENTERED, MUST BE A VALID NUMBER. | 9(03) |
| 10 | ID | NAU-PRM-MAX-DAYS-CAP-ID-VERIF<br><br>THE MAXIMUM NUMBER OF DAYS THE IDENTIFICATION VERIFICATION INFORMATION ON THE CUSTOMER INFORMATION RECORD REMAINS EFFECTIVE. THIS FIELD IS NUMERIC AND IS INITIALIZED TO ZERO. IF ENTERED, MUST BE A VALID NUMBER. | 9(03) |

FIG. 24

| 10 | MAX DAYS TO USE CR QUALIFICATION INFO: | NAU-PRM-MAX-DAYS-CAP-CR-QUA | 9(03) | THE MAXIMUM NUMBER OF DAYS A CREDIT QUALIFICATION OFFER OR MAXIMUM CREDIT EXPOSURE REMAINS EFFECTIVE ON THE CUSTOMER INFORMATION RECORD. THIS FIELD IS NUMERIC AND IS INITIALIZED TO ZERO. IF ENTERED, MUST BE A VALID NUMBER. |

FIG. 25

```
*********1*********2*********3*********4*********5*********6*********7*********8
 1 QQUA     -TERMID-    Nfn UPD       CREDIT QUALIFICATION PANEL    --USER-- --DATE-- HH:MM
 2 950121000100          Dsp QUA  Next 950121000100          Loc
 3 WILSON, MR RICK B                  WILSON, MS SUSAN G           12345678    02/01/89
 4 889 MAIN ST                        42 - 555 - 1234              DUP FRD NOTE
 5 ANYTOWN, CA 94598                  MLIA   $    8000                CBRNN   EN
 6
 7 QUALIFICATION OFFERS:
 8
 9 SUBJECT:       Univ Credit : Date                  Line
10        Act Loc  Prod  Rqst Line      Type   PRI __ SEC __ JNT __ 3RD __ 4TH __ 5TH __
11      1  _|_ __  ____  ____ ____  __  ____   Rec Line Rate   Expire          Application ID
12      2  _|_ __  ____  ____ ____  __  ____   ___  ____ ____  __/__/__  _____
13      3  _|_ __  ____  ____ ____  __  ____   ___  ____ ____  __/__/__  _____
14      4  _|_ __  ____  ____ ____  __  ____   ___  ____ ____  __/__/__  _____
15      5  _|_ __  ____  ____ ____  __  ____   ___  ____ ____  __/__/__  _____
16      6  _|_ __  ____  ____ ____  __  ____   ___  ____ ____  __/__/__  _____
17      7  _|_ __  ____  ____ ____  __  ____   ___  ____ ____  __/__/__  _____
18      8  _|_ __  ____  ____ ____  __  ____   ___  ____ ____  __/__/__  _____
19      9  _|_ __  ____  ____ ____  __  ____   ___  ____ ____  __/__/__  _____
20     10  _|_ __  ____  ____ ____  __  ____   ___  ____ ____  __/__/__  _____
21
22
23
24 PFKEYS: 1-HELP  2-MEN  3-OFF  4-CBR  5-CUS  6-HIS  7-HTX  8-SUM  9-EMP  10-Next  11-NAM
*********1*********2*********3*********4*********5*********6*********7*********8
```

FIG. 26

| ROW | LABEL | ELEMENT NAME/DESCRIPTION | SIZE |
|---|---|---|---|
| 07 | START DATE | NAU-APP-QUA-START-DATE | 9(08) |
| | | THE START DATE FOR THE CREDIT QUALIFICATION PACKAGE. THIS FIELD IS SET BY ACAPS AND IS PROTECTED. | |
| 07 | PRI | NAU-APP-PRI-QUAL-OFFERS | 9(02) |
| | | THE NUMBER OF PRODUCTS THAT THE PRIMARY APPLICANT HAS QUALIFIED FOR. THIS FIELD IS PROTECTED. | |
| 07 | SEC | NAU-APP-SEC-QUAL-OFFERS | 9(02) |
| | | THE NUMBER OF PRODUCTS THAT THE SECONDARY APPLICANT HAS QUALIFIED FOR. THIS FIELD IS PROTECTED. | |
| 07 | JNT | NAU-APP-JNT-QUAL-OFFERS | 9(02) |
| | | THE NUMBER OF PRODUCTS THAT THE PRIMARY AND SECONDARY APPLICANT HAS QUALIFIED FOR. THIS FIELD IS PROTECTED. | |
| 07 | 3RD | NAU-APP-3RD-QUAL-OFFERS | 9(02) |
| | | THE NUMBER OF PRODUCTS THAT THE BORROWER 3 HAS QUALIFIED FOR. THIS FIELD IS PROTECTED. | |
| 07 | 4TH | NAU-APP-4TH-QUAL-OFFERS | 9(02) |
| | | THE NUMBER OF PRODUCTS THAT THE BORROWER 4 HAS QUALIFIED FOR. THIS FIELD IS PROTECTED. | |
| 07 | 5TH | NAU-APP-5TH-QUAL-OFFERS | 9(02) |
| | | THE NUMBER OF PRODUCTS THAT THE BORROWER 5 HAS QUALIFIED FOR. THIS FIELD IS PROTECTED. | |

FIG. 27

| | | | |
|---|---|---|---|
| 09 | SUBJECT | NAU-APP-QUAL-SUBJECT-IND | X(03) |

THE SUBJECT PANEL FOR WHOM THE CREDIT QUALIFICATIONS OFFERS ARE DISPLAYED ON THE QUA PANEL.

VALID VALUES ARE AS FOLLOWS:

PRI    PRIMARY APPLICANT
SEC   SECONDARY APPLICANT
JNT    JOINT (PRIMARY AND SECONDARY APPLICANTS)
3RD   BORROWER 3
4TH    BORROWER 4
5TH    BORROWER 5

| | | | |
|---|---|---|---|
| 09 | UNIVERSAL CREDIT: DATE | NAU-APP-UNIVERSAL-CR-DATE | S9(08) |

THE DATE ON WHICH THE UNIVERSAL CREDIT LINE WAS DETERMINED BY THE DECISION PROCESSING FOR THE CUSTOMER. THIS FIELD IS PROTECTED.

| | | | |
|---|---|---|---|
| 09 | LINE | NAU-APP-UNIVERSAL-CR-LINE | S9(09) V99 |

THE UNIVERSAL CREDIT LINE DETERMINED BY THE DECISION PROCESSING FOR THE CUSTOMER. THIS FIELD IS PROTECTED.

| | | | |
|---|---|---|---|
| 11-20 | ACTION CODE | NAU-APP-QUA-CUS-ACTION-IND (1_10) | X(01) |

THE CUSTOMER'S ACTION CODE.

VALID VALUES ARE:

A      ACCEPT
D      DECLINE
SPACE

THIS FIELD MAY BE ENTERED ONLY IF THE QUALIFICATION OFFER HAS NOT YET EXPIRED.

FIG. 28

| | | | | |
|---|---|---|---|---|
| 11-20 | LOCATION | NAU-APP-QUA-ACAPS-LOCATION (1-10) | X(06) | THE ACAPS LOCATION CODE SELECTED BY THE BACK OFFICE UNDERWRITER OR MAPPED BY FRONT END SYSTEM. THIS FIELD MAY BE ENTERED ONLY IF THE CUSTOMER(S) ACCEPTS THE CREDIT QUALIFICATION OFFER. IF ENTERED, MUST BE A VALID ACAPS LOCATION CODE. THIS FIELD MAY BE ENTERED ONLY IF THE QUALIFICATION OFFER HAS NOT YET EXPIRED. |
| 11-20 | PRODUCT | NAU-APP-QUA-ACAPS-PRODUCT (1-10) | X(05) | THE ACAPS PRODUCT CODE SELECTED BY THE BACK OFFICE UNDERWRITER OR MAPPED BY FRONT END SYSTEM. THIS FIELD MAY BE ENTERED ONLY IF THE CUSTOMER(S) ACCEPTS THE CREDIT QUALIFICATION OFFER. IF ENTERED, MUST BE A VALID ACAPS PRODUCT CODE. THIS FIELD MAY BE ENTERED ONLY IF THE QUALIFICATION OFFER HAS NOT YET EXPIRED. |
| 11-20 | REQUESTED LINE IND | NAU-APP-QUA-RQST-LINE-IND (1-10) | X(01) | INDICATES THE CREDIT LINE ACCEPTED/REQUESTED BY THE CUSTOMER. THIS FIELD MAY BE ENTERED ONLY IF THE CUSTOMER(S) ACCEPTS THE CREDIT QUALIFICATION OFFER.<br><br>VALID VALUES ARE:<br><br>A    ACCEPT THE RECOMMENDED LINE AMOUNT<br>M    REQUEST MORE CREDIT<br>L    REQUEST LESS CREDIT<br><br>THIS FIELD MAY BE ENTERED ONLY IF THE QUALIFICATION OFFER HAS NOT YET EXPIRED. |

FIG. 29

| 11-20 | REQUESTED LINE | NAU-APP-QUA-RQST-LINE-AMT (1-10) | 9(08) |
|---|---|---|---|
| | | INDICATES THE AMOUNT ACCEPTED/REQUESTED BY THE CUSTOMER. THIS FIELD MAY BE ENTERED ONLY IF THE CUSTOMER(S) HAS ACCEPTED THE OFFER AND REQUESTED MORE/LESS CREDIT. THIS FIELD IS REQUIRED IF THE CUSTOMER HAS REQUESTED LESS CREDIT BUT IS OPTIONAL IF THE CUSTOMER HAS REQUESTED MORE CREDIT. THIS FIELD IS NOT VALIDATED AGAINST THE MINIMUM AND MAXIMUM LOAN AMOUNT PARAMETERS FOR THE SPECIFIC PRODUCT UNTIL THE OFFER IS ACCEPTED AND THE APPLICATION IS GENERATED. | |
| 11-20 | PRODUCT TYPE | NAU-APP-QUA-PRODUCT-ID (1-10) | X(05) |
| | | INDICATES THE PRODUCT CATEGORY (CLASS AND TYPE) OR THE ACTUAL ACAPS PRODUCT CODE. THIS FIELD IS RETURNED BY THE DECISION PROCESSING AND IS PROTECTED. | |
| 11-20 | REC LINE | NAU-APP-QUA-REC-LINE-AMT (1-10) | 9(08) |
| | | INDICATES THE CREDIT LINE OFFERED TO THE CUSTOMER(S). THIS FIELD IS DETERMINED BY THE DECISION PROCESSING. | |
| 11-20 | RATE | NAU-APP-QUA-REC-PRICE (1-10) | 9(4)V999 |
| | | INDICATES THE PRICE OFFERED TO THE CUSTOMER(S). THIS FIELD IS DETERMINED BY THE DECISION PROCESSING. | |
| 11-20 | EXPIRE | NAU-APP-QUA-EXPIRE-DATE (1-10) | 9(08) |
| | | INDICATES THE DATE OF EXPIRATION FOR THE CREDIT QUALIFICATION OFFER. THIS FIELD IS PROTECTED. IF THIS DATE HAS PASSED, THE CUSTOMER MAY NOT ACCEPT/DECLINE THE OFFER. | |
| 11-20 | APPLICATION ID | NAU-APP-QUA-ACAPS-APPL-ID (1-10) | X(15) |
| | | INDICATES THE ID OF THE APPLICATION GENERATED BY ACAPS WHEN THE CUSTOMER(S) HAS ACCEPTED A CREDIT QUALIFICATION OFFER. THIS FIELD IS PROTECTED. | |

FIG. 30

```
*********1*********2*********3*********4*********5*********6*********7*********8
 1 QCIF      -TERMID-     Customer Information Panel        --USER--   --DATE----HH:MM
 2                      Nfn UPD____ Dsp CAN_ Next                              Loc____
 3
 4 Search Criteria: SSN/TIN#_____      Initials__
 5                                 * * * * * * * * * *
 6
 7 Name _____  Soc/TIN_____
 8 Max Universal Line _____
 9 Verification  Inc___ Date__/__/__ By__  How__   Verified Inc_____
10              Emp___ Date__/__/__ By__  How__
11              Phn___ Date__/__/__ By__  How__
12              ID___  Date__/__/__ By__  How__
13
14 Action                              Num. of   Credit   Monthly
15 Code   Product    Application ID    Brwrs     Line     Payment    Closing Date
16  __    _____    _____    _____     _____   _____    __/__/__
17  __    _____    _____    _____     _____   _____    __/__/__
18  __    _____    _____    _____     _____   _____    __/__/__
19  __    _____    _____    _____     _____   _____    __/__/__
20  __    _____    _____    _____     _____   _____    __/__/__
21
22
23
24 PFKEYS: 1-HELP 5-MEN 3-OFF
*********1*********2*********3*********4*********5*********6*********7*********8
```

FIG. 31

| ROW | LABEL | ELEMENT NAME/DESCRIPTION | SIZE |
|---|---|---|---|
| 07 | NAME | CIF-CUSTOMER-NAME | X(40) |
| | | THE NAME OF THE BORROWER. IF THE CUSTOMER IS AN INDIVIDUAL, THE FIRST, MIDDLE INITIAL, AND LAST NAMES ARE FORMATTED. THIS FIELD IS PROTECTED. | |
| 07 | SOC/TIN | CIF-SOC-SEC-TAX-ID-NUM | X(09) |
| | | THE SOCIAL SECURITY OR TAX ID NUMBER OF THE BORROWER. THIS FIELD IS PROTECTED. | |
| 08 | MAX UNIVERSAL LINE | CIF-MAX-UNIVERSAL-LINE | S9(09)V99 |
| | | THE MAXIMUM UNIVERSAL CREDIT LINE DETERMINED BY THE DECISION PROCESSING FOR THE CUSTOMER. THIS FIELD IS PROTECTED. | |
| 09 | INC: DATE | CIF-INC-DATE-VERIFIED | 9(08) |
| | | THE DATE ON WHICH INCOME VERIFICATION WAS PERFORMED FOR THE CUSTOMER. THIS FIELD IS PROTECTED. | |
| 09 | BY | CIF-INC-USER-ID | X(08) |
| | | THE ID OF THE PERSON WHO PERFORMED INCOME VERIFICATION. THIS FIELD IS PROTECTED. | |
| 09 | HOW | CIF-INC-HOW-VERIFIED-1<br>CIF-INC-HOW-VERIFIED-2 | X(02) |
| | | THE CODES INDICATING HOW INCOME WAS VERIFIED. THESE FIELDS ARE PROTECTED. | |
| 09 | VERIFIED INC | CIF-INC-TOTAL-VERIFIED-AMT | 9(09)V99 |
| | | THE TOTAL INCOME AMOUNT VERIFIED FOR THE CUSTOMER. THIS FIELD IS PROTECTED. | |

FIG. 32

| | | | |
|---|---|---|---|
| 10 | EMP: DATE | CIF-EMP-DATE-VERIFIED | 9(08) |
| | | THE DATE ON WHICH EMPLOYMENT VERIFICATION WAS PERFORMED FOR THE CUSTOMER. THIS FIELD IS PROTECTED. | |
| 10 | BY | CIF-EMP-USER-ID | X(08) |
| | | THE ID OF THE PERSON WHO PERFORMED EMPLOYMENT VERIFICATION. THIS FIELD IS PROTECTED. | |
| 10 | HOW | CIF-EMP-HOW-VERIFIED-1<br>CIF-EMP-HOW-VERIFIED-2 | X(02) |
| | | THE CODES INDICATING HOW EMPLOYMENT WAS VERIFIED. THESE FIELDS ARE PROTECTED. | |
| 11 | PHN: DATE | CIF-PHN-DATE-VERIFIED | 9(08) |
| | | THE DATE ON WHICH PHONE VERIFICATION WAS PERFORMED FOR THE CUSTOMER. THIS FIELD IS PROTECTED. | |
| 11 | BY | CIF-PHN-USER-ID | X(08) |
| | | THE ID OF THE PERSON WHO PERFORMED PHONE VERIFICATION. THIS FIELD IS PROTECTED. | |
| 11 | HOW | CIF-PHN-HOW-VERIFIED-1<br>CIF-PHN-HOW-VERIFIED-2 | X(02) |
| | | THE CODES INDICATING HOW EMPLOYMENT WAS VERIFIED. THESE FIELDS ARE PROTECTED. | |
| 12 | ID: DATE | CIF-ID-DATE-VERIFIED | 9(08) |
| | | THE DATE ON WHICH ID VERIFICATION WAS PERFORMED FOR THE CUSTOMER. THIS FIELD IS PROTECTED. | |
| 12 | BY | CIF-IDUSER-ID | X(08) |
| | | THE ID OF THE PERSON WHO PERFORMED ID VERIFICATION. THIS FIELD IS PROTECTED. | |

FIG. 33

| | | | |
|---|---|---|---|
| 12 | HOW | CIF-ID-HOW-VERIFIED-1<br>CIF-ID-HOW-VERIFIED-2 | X(02) |
| | | THE CODES INDICATING HOW ID WAS VERIFIED. THESE FIELDS ARE PROTECTED. | |
| 16-20 | ACTION CODE | CIF-DB-INCLUDE-IND (1-5) | X(01) |
| | | INDICATES IF THE MONTHLY PAYMENT AMOUNT ON THE LOAN SHOULD BE INCLUDED IN DEBT BURDEN ANALYSIS FOR A NEW CREDIT REQUEST FOR THE CUSTOMER. VALID VALUES ARE "Y" (YES) AND "N" (NO). THIS FIELD IS INITIALLY SET TO "Y" AND SYSTEMICALLY CHANGED TO "N" WHEN A BACKFEED IS RECEIVED FROM THE CLOSING SYSTEM. IN ADDITION, THIS FIELD MAY BE MANUALLY SET. | |
| 16-20 | PRODUCT | CIF-ACAPS-PRODUCT-CODE (1-5) | X(05) |
| | | THE ACAPS PRODUCT CODE FOR THE LOAN. THIS FIELD IS PROTECTED. | |
| 16-20 | APPLICATION ID | CIF-ACAPS-APPL-ID (1-5) | X(15) |
| | | THE ACAPS APPLICATION ID FOR THE LOAN. THIS FIELD IS PROTECTED. | |
| 16-20 | NUM OF BRWRS | CIF-NUM-OF-BORROWERS (1-5) | 9(01) |
| | | THE TOTAL NUMBER OF BORROWERS ON THE LOAN. THIS FIELD IS PROTECTED. | |
| 16-20 | CREDIT LINE | CIF-APRV-AMT (1-5) | 9(09) V99 |
| | | THE FINAL LOAN AMOUNT, RETURNED BY THE CLOSING SYSTEM. THIS FIELD IS PROTECTED. | |
| 16-20 | MONTHLY PAYMENT | CIF-APRV-MONTHLY-PMT-AMT (1-5) | 9(09) V99 |
| | | THE FINAL MONTHLY PAYMENT AMOUNT, RETURNED BY THE CLOSING SYSTEM. THIS FIELD IS PROTECTED. | |
| 16-20 | CLOSING DATE | CIF-DATE-OF-CLOSING (1-5) | 9(08) |
| | | THE DATE OF CLOSING FOR THE LOAN. THIS FIELD IS PROTECTED. | |

MAXIMUM DEBT BURDEN OFFER CALCULATION

1. Total Income * Maximum TDSR % = TOTAL ALLOWABLE MONTHLY
   (specified on PM6 Table)     PAYMENT DEBT 2. Total ALLOWABLE      [Total Payment Debt      Total Payment Adjustments
   Monthly Payment   -  from Credit Bureau    +  from the Liability Panel]
   Debt                 Report

= MAXIMUM ALLOWABLE FOR
     NEW LOAN PAYMENT

3. Maximum Allowable for New Loan Payment / Payment Calculation Method = MAXIMUM DEBT
   BURDEN OFFER where Payment Calculation Method is defined as:
   * Secured Products:
      a. ESA (Variable Interest) Products:
         Payment Calculation Method = Monthly Interest Rate
      b. Home Equity (Fixed Rate) Products and Preferred Loan:
         Payment Calculation Method = 1 / Present Value
      c. Preferred Line:
         Payment Calculation Method = ((1 +(Monthly Interest Rate*Term))/Term)

* Unsecured Products:
      a. Revolving Loans (Checking Plus, Ready Credit, Bankcards):
         Payment Calculation Method = Potential Liability % [specified on PMI Table]
      b. Installment Loans:
         Payment Calculation Method = 1 / Present Value

| Use Step Ind | CS2 Step Ind | Requested Amount | Recommended Credit Limit | Maximum DB Offer | Decisioned/ Line Amount |
|---|---|---|---|---|---|
| Y | Y | 10,000 | 7,000 | 5,000 | 5,000 |

A. THE RECOMMENDED CREDIT LIMIT IS ASSIGNED USING THE CREDIT LIMIT PROFILE TABLE THE FIRST TIME SECOND-PASS SCORING IS PERFORMED.

B. MAXIMUM DEBT BURDEN OFFER IS CALCULATED.

C. LINE ASSIGNMENT IS PERFORMED THE FIRST TIME SECOND-PASS SCORING IS PERFORMED. THE INTERMEDIATE LINE AMOUNT IS THE RECOMMENDED CREDIT LIMIT. IF THE INTERMEDIATE LINE AMOUNT FALLS WITHIN THE DEBT BURDEN REVIEW RANGE, MAXIMUM DB OFFER LINE ASSIGNMENT IS PERFORMED, AND THE FINAL LINE AMOUNT IS THE LESSER OF THE MAXIMUM DB OFFER AND THE INTERMEDIATE LINE AMOUNT. IF THE INTERMEDIATE LINE AMOUNT DOES NOT FALL WITHIN THE DEBT BURDEN REVIEW RANGE, THE INTERMEDIATE LINE AMOUNT BECOMES THE FINAL LINE AMOUNT.

D. ANY SUBSEQUENT CHANGES TO THE MAXIMUM DB OFFER DO NOT CHANGE THE LINE AMOUNT.

FIG. 36

| Use Step Ind | CS2 Step Ind | Requested Amount | Recommended Credit Limit | Maximum DB Offer | Decisioned/ Line Amount |
|---|---|---|---|---|---|
| Y | E | 10,000 | 7,000 | 5,000 | 5,000 |
| | | | 4,000 | 5,000 | 4,000 |
| | | | 4,000 | 3,000 | 3,000 |

A. THE RECOMMENDED CREDIT LIMIT IS ASSIGNED USING THE CREDIT LIMIT PROFILE TABLE EACH TIME SECOND-PASS SCORING IS PERFORMED.

B. MAXIMUM DEBT BURDEN OFFER IS (RE)CALCULATED EACH TIME ANY VARIABLE IS CHANGED.

C. INITIAL LINE ASSIGNMENT IS PERFORMED THE FIRST TIME SECOND-PASS SCORING IS PERFORMED. IF THE INTERMEDIATE LINE AMOUNT IS THE RECOMMENDED CREDIT LIMIT. IF THE INTERMEDIATE LINE AMOUNT FALLS WITHIN THE DEBT BURDEN REVIEW RANGE, MAXIMUM DB OFFER LINE ASSIGNMENT IS PERFORMED, AND THE FINAL LINE AMOUNT IS THE LESSER OF THE MAXIMUM DB OFFER AND THE INTERMEDIATE LINE AMOUNT. IF THE INTERMEDIATE LINE AMOUNT DOES NOT FALL WITHIN THE DEBT BURDEN REVIEW RANGE, THE INTERMEDIATE LINE AMOUNT BECOMES THE FINAL LINE AMOUNT.

D. ANY SUBSEQUENT CHANGES TO VARIABLES THAT REINVOKE SECOND-PASS SCORING REINVOKE LINE ASSIGNMENT.

E. MANUAL UPDATE OF THE DECISIONED AMOUNT ON THE SUM OR PII PANELS DOES NOT REINVOKE LINE ASSIGNMENT.

FIG. 37

| Use Step Ind | CS2 Step Ind. | Requested Amount | Recommended Credit Limit | Maximum DB Offer | Decisioned/ Line Amount |
|---|---|---|---|---|---|
| Y | D | 10,000 | 7,000 | 8,000 | 7,000 |
| | | | 7,000 | 4,000 | 4,000 |
| | | | 3,000 | 4,000 | 4,000 |
| | | | 3,000 | 3,500 | 3,500 |

A. THE RECOMMENDED CREDIT LIMIT IS ASSIGNED USING THE CREDIT LIMIT PROFILE TABLE EACH TIME SECOND-PASS SCORING IS PERFORMED.

B. MAXIMUM DEBT BURDEN OFFER IS (RE)CALCULATED EACH TIME ANY VARIABLE IS CHANGED.

C. INITIAL LINE ASSIGNMENT IS PERFORMED THE FIRST TIME SECOND-PASS SCORING IS PERFORMED. THE INTERMEDIATE LINE AMOUNT IS THE LESSER OF THE RECOMMENDED CREDIT LIMIT OR THE REQUEST AMOUNT. IF THE INTERMEDIATE LINE AMOUNT FALLS WITHIN THE DEBT BURDEN REVIEW RANGE, MAXIMUM DB OFFER LINE ASSIGNMENT IS PERFORMED, AND THE FINAL LINE AMOUNT IS THE LESSER OF THE MAXIMUM DB OFFER AND THE INTERMEDIATE LINE AMOUNT. IF THE INTERMEDIATE LINE AMOUNT DOES NOT FALL WITHIN THE DEBT BURDEN REVIEW RANGE, THE INTERMEDIATE LINE AMOUNT BECOMES THE FINAL LINE AMOUNT.

D. ANY SUBSEQUENT CHANGES TO THE RECOMMENDED CREDIT LIMIT DO NOT RE-INVOKE LINE ASSIGNMENT.

E. ANY SUBSEQUENT CHANGES TO THE MAXIMUM DB OFFER DO RE-INVOKE LINE ASSIGNMENT IF THE CURRENT LINE AMOUNT FALLS WITHIN THE DEBT BURDEN REVIEW RANGE. IF SO, MAXIMUM DB OFFER LINE ASSIGNMENT IS PERFORMED, AND THE FINAL LINE AMOUNT IS THE LESSER OF THE MAXIMUM DB OFFER AND THE CURRENT LINE AMOUNT.

FIG. 38

| Use Step Ind | CS2 Step Ind. | Requested Amount | Recommended Credit Limit | Maximum DB Offer | Decisioned/ Line Amount |
|---|---|---|---|---|---|
| Y | F | 10,000 | 11,000 | 12,000 | 10,000 |
|   |   |        | 9,000  | 12,000 | 10,000 |
|   |   |        | 9,000  | 8,000  | 8,000  |
|   |   |        | 3,000  | 3,500  | 3,500  |

A. THE RECOMMENDED CREDIT LIMIT IS ASSIGNED USING THE CREDIT LIMIT PROFILE TABLE EACH TIME SECOND-PASS SCORING IS PERFORMED.

B. MAXIMUM DEBT BURDEN OFFER IS (RE)CALCULATED EACH TIME ANY VARIABLE IS CHANGED.

C. INITIAL LINE ASSIGNMENT IS PERFORMED THE FIRST TIME SECOND-PASS SCORING IS PERFORMED. THE INTERMEDIATE LINE AMOUNT IS THE REQUEST AMOUNT. IF THE INTERMEDIATE LINE AMOUNT FALLS WITHIN THE DEBT BURDEN REVIEW RANGE, MAXIMUM DB OFFER LINE ASSIGNMENT IS PERFORMED, AND THE FINAL LINE AMOUNT IS THE LESSER OF THE MAXIMUM DB OFFER AND THE INTERMEDIATE LINE AMOUNT. IF THE INTERMEDIATE LINE AMOUNT DOES NOT FALL WITHIN THE DEBT BURDEN REVIEW RANGE, THE INTERMEDIATE LINE AMOUNT BECOMES THE FINAL LINE AMOUNT.

D. ANY SUBSEQUENT CHANGE TO THE RECOMMENDED CREDIT LIMIT DOES NOT RE-INVOKE LINE ASSIGNMENT.

E. ANY SUBSEQUENT CHANGE TO THE MAXIMUM DB OFFER DOES RE-INVOKE LINE ASSIGNMENT IF THE CURRENT LINE AMOUNT FALLS WITHIN THE DEBT BURDEN REVIEW RANGE. IF SO, MAXIMUM DB OFFER LINE ASSIGNMENT IS PERFORMED, AND THE FINAL LINE AMOUNT IS THE LESSER OF THE MAXIMUM DB OFFER AND THE CURRENT LINE AMOUNT.

FIG. 39

CCH PRIORITY TABLE

| Routing Condition | Route to State | Priority |
|---|---|---|
| 1. Pre-Credit Bureau Routing | Pre-CB Rte St (PM@) | 1 |
| 2. First Pass Credit Scoring | 1st Pass Scr Rte St (PM3) | 6 |
| 3. First Pass Review Rule | 1st Pass RR Rte St (PM6) | 8 |
| 4. Duplicate Application | Duplicate Rtr St (PM1) | 10 |
| 5. Fraud File Match | Fraud Rte St (PM1) | 12 |
| 6. Minimum Income Requirement | Min Inc Rte St (PM2) | 14 |
| 7. Minimum Age Requirement | Min Age Rte St (PM2) | 16 |
| 8. Preapproved Product | Pre-Approval Rte St (PM2) | 18 |
| 9. Post-Credit Bureau Routing | Post CB Rte St (PM2) | 20 |
| 10. Second Pass Credit Scoring | 2nd Pass Scr Rte St (PM3) | 20 |
| 11. Verification Failed | Verification Rte St (PM2) | 20 |
| 13. No Credit Bureau Hits | No Hit Rte St (PM2) | 22 |
| 14. Multiple Credit Bureau Hits | Mult Hits Rte St (PM2) | 22 |
| 15. List of Similars Received | Lst of Similar Rte St (PM2) | 22 |
| 16. No Report Requested | No Rpt Rqst Rte St (PM2) | 22 |
| 17. Credit Bureau Hits Copied | CBR Copied Rte St (PM2) | 22 |
| 18. Credit Bureau Review Rule/Disaster | CB RR Rte St (PM7) | 26 |
| 19. Debt Burden Review | 2nd Pass RR Rte St (PM6) | 27 |
| 20. AFS Error Encounter | AFS Rte St (PM1) | 28 |
| 21. 2nd Pass Review Rule - Failed Application Pre-Screen | CB RR Rte St (PM7) | 29 |
| 22. Automated Exception | Auto Exc Rte St (PM3) | 30 |
| 23. Employee Application Route | Employee Rte St (PM2) | 31 |
| 24. Post Credit Bureau Fraud/Duplicate | Post Frd/Dup Rte St (PM1) | 32 |
| 25. 2nd Pass Scoring - Turndown Queue | Reject Ser Rte St (PM3) | 33 |
| 26. 2nd Pass Review Rule/Disaster Fail | CB RR Rte St (PM7) | 33 |

SYSTEM AND METHOD TO PERFORMING ON-LINE CREDIT REVIEWS AND APPROVALS

This Appln claims the benefit of U.S. Provisional Appl No. 60/008,538 filed Dec. 12, 1995.

FIELD OF THE INVENTION

The present invention relates generally to systems and methods for performing reviews and approvals of credit and liability applications, and more particularly to a system and method for performing automated, real-time, on-line review of credit and liability applications.

BACKGROUND OF THE INVENTION

The process of applying for credit or liability products usually begins with an applicant requesting either credit or liability products; and in the case of credit requests, usually the applicant requests credit on a single credit product. As used herein, an applicant can be either an existing customer or a potential customer, and can be either an individual, several individuals or an entity, such as a corporation, partnership or association. In any case, applicant merely refers to an individual(s) or entity submitting an application to a financial institution for credit or liability products. When an applicant enters a financial institution to apply for some credit or liability product offered by the financial institution, the local branch representative (LBR) requires the applicant to fill out an application and then typically forwards the application to a back office, where the application is reviewed to determine whether or not to extend the requested credit or to open the requested liability account.

Most financial institutions apply some criteria to determine whether the applicant is credit worthy for the particular credit product requested, and some financial institutions apply some criteria to determine which requests to open a demand deposit account (a bank liability) should be allowed. Usually the differentiation of criteria for each product is based on risk and acceptable levels of losses.

Unfortunately, a large segment of the population may fail this initial screening criteria for one reason or another. To make matters worse, the LBR cannot immediately differentiate credit worthy applicants from the rest. This requires the LBR to spend a substantial amount of time with some applicants, only to ultimately determine that they do not meet the financial institution's criteria. This creates an inefficiency in the lending process; those most deserving of credit or liability products must wait longer to obtain the desired product while the LBR spends extensive sales time on all applicants, some of which may not qualify for any credit or liability products. These inefficiencies result in customer service dissatisfaction and higher fees for all applicants.

The present invention is therefore directed to the problem of developing a method and system for performing credit and liability reviews that: (1) identify a credit worthy applicant or provide an indication that an applicant is probably not credit worthy for the particular product being requested (thus eliminating the need to fulfill the entire sales session) to the LBR immediately at the time of the application; (2) provide systematic verification requirements; (3) provide a liability screen (demand deposit screen) for the financial institution; (4) provide pricing by tier for specified products; (5) provide an interface to service bankcard products; (6) enable maximum debt burden offer logic; and (7) provide application pending functionality.

SUMMARY OF THE INVENTION

The present invention solves this problem by providing a user-friendly on-line computerized system that streamlines the processing of applications for products and services offered by a financial institution, that automates many steps in the review and approval process, that performs background credit worthiness comparisons based upon an applicant's credit score, financial information and new or existing relationship with the financial institution, if any, that recommends to those applicants who exceed the initial criteria for credit consideration specific credit products with predetermined credit qualified offer amounts, and that ensures the required operating (credit/liability) policies are appropriately completed.

According to the present invention, specifically for credit requests, the system immediately analyzes an applicant's credit bureau history, automated credit scoring, credit policies and the applicant's new or existing relationship with the financial institution, if any, and provides these results to the LBR in a summarized format. This feature enables the LBR the ability to provide applicants with an up-front automated conditional approval, subject to required verifications.

The system and method of the present invention alleviate the loss of time problem for the lender by offering a capability of identifying applicants to whom the financial institution would like to extend credit and/or liability products, based on those requested, or to offer additional services or other credit and/or liability products. For example, by identifying an applicant as potentially credit worthy for a variety of other products that the applicant has not requested, the LBR can offer a more attractive package of products to the applicant that will enhance the service and potentially the pricing being provided. This feature enables the LBR to target his or her efforts to those applicants to which the financial institution can offer a full range of services and benefits, above and beyond those requested by the applicant.

Another advantageous implementation of the system and method of the present invention provide the capability of recommending to those applicants who exceed the initial criteria for credit consideration specific products with predetermined credit qualified offer amounts.

Another advantageous implementation of the system and method of the present invention provide the capability to present applicants requesting credit with the maximum allowable line of credit or loan amount whose estimated payment would not exceed the product specification parameters. Thus, the system and method of the present invention provide the capability to incorporate into automated response processing resulting up-sells or counter-offers, as they relate to the applicant's credit request. As a result of the present invention this capability is now available at the local branch, which heretofore was not possible.

Another advantageous implementation of the system and method of the present invention provides the capability to the financial institution to continue processing an application that was begun at an earlier point in time with potentially a different LBR. Previously, each credit or liability application began anew. For example, prior to the present invention when an applicant first entered the financial institution to request a credit or liability product, and the applicant provided some initial information but then left for one reason or another (due to time constraints, etc.), the incomplete application was discarded, and along with the discarded application went the LBR's time—a value commodity in today's competitive environment. As a result of the present invention, any LBR can continue processing a previous application initiated by himself or herself or any other LBR, thus making use of the time spent previously, as well as saving the applicant from having to repeat all previously supplied data.

Traditionally, verification requirements are created or generated after full review of the credit application and subsequent conditional approval. In another advantageous implementation of the present invention, systematically driven verifications categories based on the amount offered and the amount accepted are detailed within the front-end process, identifying to the LBR any and all verification requirements—thus enabling fulfillment of required verifications during the initial session, provided the applicant has the information available (e.g., identification, phone, employment, income, etc.). This eliminates the standard "paper chase" between the branch and the applicant, as well as helping to ensure compliance with verification requirements and thus potentially avoiding fraud issues.

The present invention provides an expeditious manner in which consumer retail branches can provide an immediate credit evaluated response (conditional approval, upsell and/or counter-offer pending required verifications) to qualified applicant credit requests (e.g., unsecured and real estate secured), while ensuring that the financial institution's required credit policies are appropriately completed, limiting risk to the portfolio.

Yet another advantage of the present invention is that systematic completion of required verifications enables on-site acceptance of credit requests and subsequent issuance of funds. In addition, the systematic presentation of required verifications to the LBR eliminates the need for the LBR to continually calculate and re-calculate which specific verifications are required before an application may be completed, saving an enormous amount of time and paperwork.

Another advantageous implementation of the present invention, is relationship pricing by tier. Relationship pricing by tier provides a new or existing customer requesting credit with the least expensive loan rate based upon the customer's total relationship (i.e., deposit balances) with the financial institution. The automation of the selection of the appropriate rate solves the problem of choosing the correct rate in an environment that is complicated by many rate alternatives and by the depth and complexity of the customer's relationship with the financial institution.

According to an advantageous implementation of the present invention, the present invention performs a systematic analysis of an applicant's social security number and a review of the applicant's checking account and credit bureau history to determine whether or not to offer the applicant a checking account (demand deposit account) type relationship. This evaluation is systematic in nature and affords the financial institution an efficient method of screening potential checking account candidates while potentially holding fraud loss rates down.

Further, another advantageous implementation of the present invention provides a systematic link to the bankcard acquisition process for on-line processing of branch sourced bankcard applications.

The foregoing objects of the invention are illustrative of what can be achieved by the present system and method, and the foregoing objects are not intended to be exhaustive or limiting of other possible objectives. Thus, these and other objects of the invention will be apparent from the description set forth herein or can be learned from practicing the invention, both as embodiments presented as modified in view of variations that may become apparent to those having ordinary skill in the art. The present invention resides in the novel system, method, arrangement, and combinations that are herein shown and described.

The foregoing and other objects and advantages of the present invention will appear from the following description, wherein reference is made to the accompanying drawings figures that form a part thereof, and in which there is shown by way of illustration and not of limitation, a preferred embodiment of the invention.

BRIEF DESCRIPTION OF THE DRAWINGS

FIG. 2 shows credit application status codes, credit score response codes and credit decision messages used with the system and method of the present invention.

FIG. 3 shows a credit product definition maintenance screen used by the system and method of the present invention.

FIGS. 4A–C each show credit decision processing data elements used by the system and method of the present invention.

FIG. 5 shows a credit product definition maintenance screen used with the system and method of the present invention.

FIGS. 6A–E each show credit decision processing data elements used with the system and method of the present invention.

FIG. 7 shows a credit product definition maintenance screen used with the system and method of the present invention.

FIG. 8 shows a credit decision processing data elements used with the system and method of the present invention.

FIG. 9 shows a credit product decision maintenance screen used with the system and method of the present invention.

FIGS. 10A–H each show credit decision processing data elements used with the system and method of the present invention.

FIG. 11 shows the relationship pricing profile matrix used with the system and method of the present invention.

FIG. 12 shows the relationship criteria codes and concatenation rules used with the system and method of the present invention.

FIGS. 13A–B each show credit decision processing data elements used with the system and method of the present invention.

FIG. 14 shows a product profile maintenance screen used with the system and method of the present invention.

FIG. 15 shows a credit decision processing data elements used with the system and method of the present invention.

FIG. 16 shows a credit decision processing verifications requirements used with the system and method of the present invention.

FIGS. 17A–E each show credit decision processing data elements used with the system and method of the present invention.

FIG. 18 shows an applicant product and insurance information screen used with the system and method of the present invention.

FIG. 19 shows credit decision evaluation data elements used with the system and method of the present invention.

FIG. 20 shows an applicant income information screen used with the system and method of the present invention.

FIG. 21 shows a credit decision evaluation data elements screen used with the system and method of the present invention.

FIG. 22 shows a credit product decision definition maintenance screen used with the system and method of the present invention.

FIG. 23 shows data elements for the credit decision and credit qualifying process used with the system and method of the present invention.

FIG. 24 shows data elements for the credit decision and credit qualifying process used with the system and method of the present invention.

FIG. 25 shows the credit qualification panel by the system and method of the present invention.

FIGS. 26–29 each show data elements for the credit decision and credit qualifying process used with the system and method of the present invention.

FIG. 30 shows the applicant information panel used by the system and method of the present invention.

FIGS. 31–33 show data elements for the credit decision and credit qualified offer process used with the system and method of the present invention.

FIG. 34 shows the calculation formula used in the system and method of the present invention.

FIGS. 35–38 each show the Maximum Debt Burden Offer calculation used with the system and method of the present invention.

FIG. 39 shows the application routing condition priority table used with the system and method of the present invention.

DETAILED DESCRIPTION

Figure 1A:
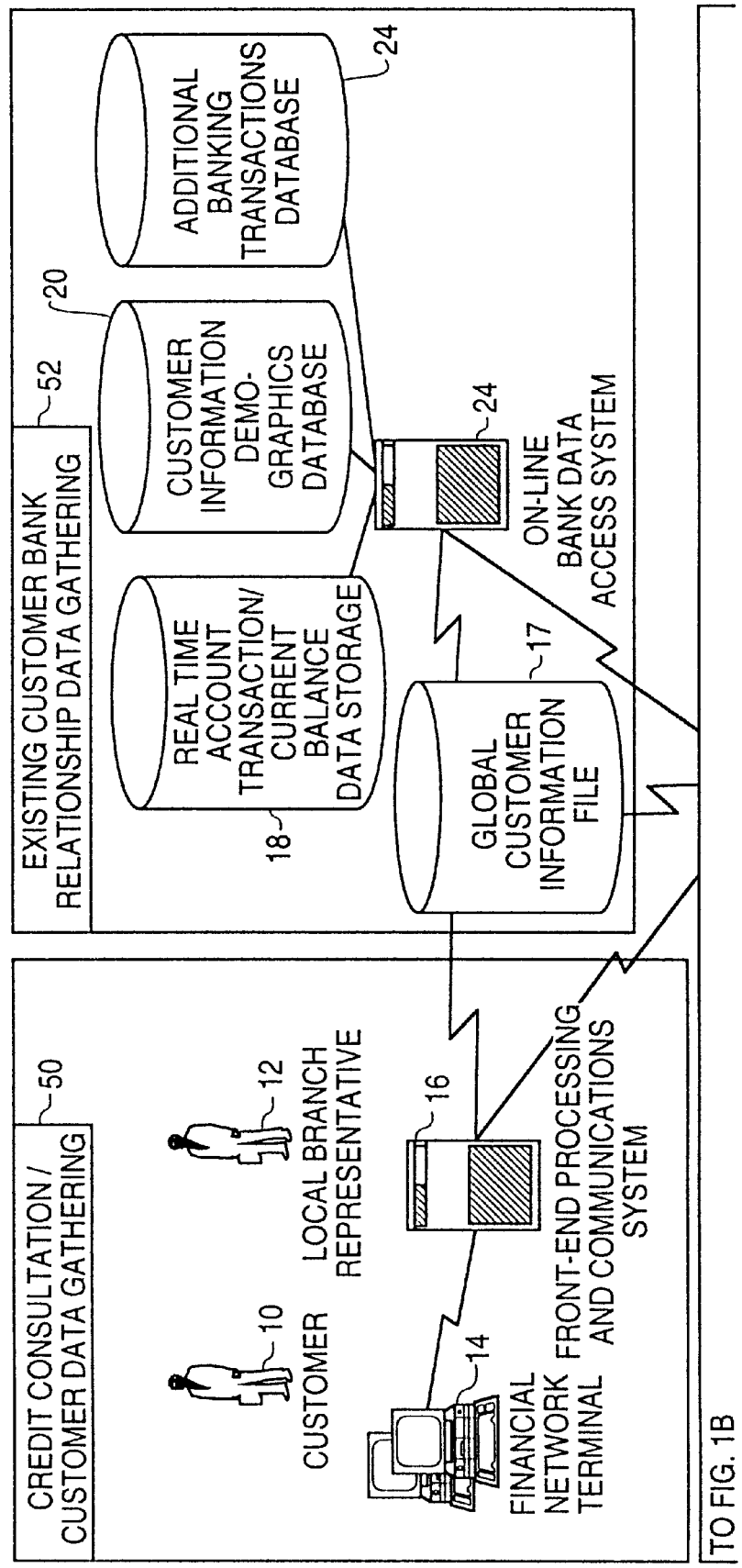
FIG. 1 shows a block diagram of the system and method of the present invention.

The system and method of the present invention (FIG. 1) provide on-line processing of applications in real time, thus providing conditional approvals, pending required verifications. Many lenders process applications via on-line systems, however, most do not offer the system capability of a front-end processing system (blocks 14 and 16) that provides an immediate review of the results of analyzing an applicant's credit bureau history (blocks 28, 30, 32 and 34) and automated credit scoring. The system and method of the present invention involves the unique processing of a new or existing customer relationship (blocks 18, 20 and 22) into the credit decision request. This feature enables the ability to provide new or existing customers (block 10) with an up-front conditional approval (based on systematic evaluation of credit bureau history, credit score, debt burden, credit policies and the customer's relationship with the financial institution), subject to required verifications.

The present invention interfaces with the commercially available credit processing system ACAPS (block 26).

The processing according to the present invention streamlines the credit and liability application/approval process which results in more timely decisions. The process enhances branch efficiencies and productivity by automating many steps in the credit/liability application and approval process that are traditionally paper-intensive.

In addition to credit application processing, this implementation also performs background credit worthiness evaluations for non-credit application processing (such as to open demand deposit accounts) based upon the applicant's credit bureau information, financial information and new or existing relationship with the financial institution, if any. These evaluations may create a decision that results in an indication that the applicant 10 is credit qualified. These indications will show the LBR 12 which applicants exceed the initial criteria for credit approval, and may recommend specific credit products with pre-determined credit qualified offer amounts, as well as identifying those applicants to which to offer more attractive credit product opportunities.

Business Problem Solved Credit Response

The present invention provides an expeditious manner in which consumer retail branches can provide an immediate credit evaluated response (conditional approval, upsell and/or counter-offer pending required verifications) to qualified applicant credit requests (e.g., unsecured and real estate secured), while ensuring that the financial institution's required credit policies are appropriately completed, thereby potentially limiting risk to the portfolio.

All established product program requirements (front-end screens, disaster screens, credit score, debt burden), as well as consideration of a new or existing customer's deposit balance, are systematically completed and ranked (A, B, C, D) within a matter of seconds. This enables the LBR 12 to immediately convey credit evaluation status (recommended approval, conditional approval, upsell, counter-offer, recommended turndown) to the applicant 10. The A, B, C, D status rankings indicate to the LBR 12 the direction to take during the sales session (i.e., the systematically provided rankings identify high and low credit risks). For purposes of expeditious back office processing, block 44, these rankings also delineate which requests for credit may be processed for immediate appeal, resulting in an immediate booking or immediate adverse action. This enables the LBR 12 to immediately identify an applicant that is highly valuable to the financial institution.

Reference the following chart that details the actions associated with various responses used in the system and method of the present invention:

| RESPONSE | CONDITION |
|---|---|
| A | Recommended Approval<br>The LBR has already completed the required verifications, and with the applicant's consent, accepts the credit request, which systematically initiates an interface to the booking system (i.e., servicing or billing system) for specified products.<br>Conditional Approval/Counter-Offer<br>The LBR must complete all required verifications (e.g., identification, phone, employment, income. etc.). Upon completion of required verifications and with the applicant's consent, the LBR may "Accept" the credit request, which systematically initiates an interface to the booking system (for specified products). |
| B | Recommended Turndown<br>The system has identified that: (1) the applicant is non-established, or a Non-Resident Alien (NRA); or (2) the applicant has limited or marginal credit; or (3) the applicant has credit bureau issues (derogatory trade) and high liability balances. In all three cases, the LBR may contact the back office with an immediate appeal. |
| C | Recommended Turndown |
| D | Recommended Turndown |

The product profile requirement tables detail the parameters of the credit evaluating processes (e.g., front-end screens, disaster screens, credit score, debt burden and liability balances) by product type within a region. These parameters are systematically evaluated at the time the application is transmitted via the front-end processing system (blocks 14 and 16) or entered into ACAPS 26.

Evaluation of previously established approval criteria is divided into two segments (i.e., subcodes, which are credit decision and bank liability decision). Within risk evaluating components (e.g., front-end screens, disaster screen, credit score and debt burden) various conditions are allocated specific A, B, C, or D response code rankings. The worst (B is worse than A, C is worse than B, etc.) alpha ranking of all components under consideration for the credit decision is selected as the credit decision subcode. The credit decision subcode and the liability decision subcode are compared and the best (A is better than B, B is better than C, etc.) of the two subcodes is chosen to determine the response code to be transmitted back to the LBR 12 via the front-end platform (blocks 14 and 16). Evaluation and transmission on average take only a matter of seconds and are available 7 days a week, which enables the LBRs 12 almost instantaneous—on the spot—response to the applicant's request for credit. For unsecured products (e.g., installment loans) the ability to finalize the credit request at the branch also affords the LBR the opportunity to fulfill the request in the branch during the initial session.

The response logic of the present invention is region and product-specific enabling flexible credit evaluating criteria to be appropriately controlled to ensure an acceptable credit risk exposure based on changes in regional portfolio conditions, changes in economy, etc. As used herein, location refers to a defined region (i.e., state, etc.).

Maximum Debt Burden Offer

The Maximum Debt Burden Offer provides applicants requesting credit (revolving or closed-end) with the maximum allowable line of credit or loan amount, whose estimated payment for the requested product, in addition to all known debt payments (applicant provided debt, including rent or mortgage payments, and credit bureau derived payments), would not exceed the product specified parameters (line assignment tables) up to the designated controlling debt burden table parameter such as 45%. The resulting upsell or counter-offer, as it relates to the applicant's credit request, is incorporated within response processing of the present invention and is therefore available for the LBR (block 12 ) to discuss with the applicant 10 within the session.

Maximum Debt Burden Offer is initiated when an applicant's request for credit exceeds a specified amount that can vary by location and product. ACAPS 26 systematically evaluates the following components to determine whether or not to upsell or counter-offer after evaluation of the following components:

| REQUESTED CREDIT | 1) Applicant requested amount<br>2) Maximum amount eligible (Applicant does not specify a specific amount, rather applicant requests the maximum amount for which the applicant is eligible.)<br>3) Product Maximum |
|---|---|
| MAXIMUM DEBT BURDEN OFFER | Maximum loan or line dollar amount whose associated monthly payment, when added to the monthly payment amounts for the applicant's existing debts and rent or mortgage payment, divided by the customer's monthly income, creates a debt burden ratio (such as 45%) that is specified in the product parameters.<br>If the maximum debt burden amount is negative or not used because amount requested is less than designated parameter (e.g., $2,500) the amount assigned to Maximum Debt Burden Offer will default to product minimum. |
| LINE ASSIGNMENT | Systemic Line Assignment Tables |

An applicant's good credit experience, monthly income and monthly debt payments (incorporating estimated monthly payment associated with the newly requested debt) are systematically evaluated upon transmission of credit request providing the LBR 12 and applicant 10 with knowledge of the maximum exposure that the product programs will allow prior to judgmental review. This process primarily uses monthly credit bureau information, including mortgage payments, which allows a Maximum Debt Burden Offer without applicant 10 provided information. Overall, the process of the present invention provides improvement in credit evaluation/processing time as well as a substantial reduction in unit cost processing (i.e., 65% decrease) while providing an elegance in sales conversation and expeditious decisions (in person or on the phone) for both approvals and turndowns.

Systemic Verifications

Systemic verification provides an LBR 12 with systematic identification of verification categories required (product program) based on the amount offered and accepted which is displayed on the front-end platform (blocks 14 and 16). The platform provides the required verifications in a picklist format and enables the LBR 12 to select a methodology of completing required verifications, which is then transmitted to ACAPS 26. The system allows an LBR, when directed by the applicant, to accept an offered line or loan amount at any time after the offer is made—thus completing the application cycle of application, financial institution decision, offer to applicant, acceptance of offer, and in some cases, the issuance of funds, pending required verifications. However, in the presence of unsatisfied verification requirements, the system will not allow the subsequent new account opening functionalities (i.e., booking) to automatically be performed. The system requires an "acceptance" transaction to be performed (usually by the LBR) after all the verification requirements have been satisfied to allow the subsequent new account opening functionalities to be automatically performed, thus ensuring compliance with the verification requirements and potentially avoiding fraud issues.

Systematic completion of required verifications enables on-site acceptance of credit requests and subsequent issuance of funds for designated products, e.g., installment loans. The ACAPS 26 system has imbedded into each product classification a required verifications profile (FIGS. 16 through 17E), which indicates which types of verifications are required based on the amount requested and, eventually, the amount accepted by the applicant 10. The systematic presentation of required verifications eliminates the need for the LBR 12 to continually calculate and re-calculate which specific verifications are required before an application may be completed. In addition to the ACAPS 26 automated presentation of the types of required verifications necessary, it also provides to the front end processing system (blocks 14 and 16) a listing of types of required verifications that may be performed to fulfill the verification requirements. This listing is converted into a picklist of required verifications options, which facilitates for the LBR 12 rapid completion of required verification procedures.

The ACAPS 26 maintains verification requirements (which are table driven) by region and product, which identify by designated offered and accepted amount of credit exactly which type of verifications (e.g., identification, phone, employment, income, etc.) are required before the system will enable the application for credit to be accepted. Differentiation by product type enables ACAPS 26 to establish appropriate verification requirements for branch or back-office generated requests and for different product types (e.g., unsecured/real estate secured, etc.). The branch front-end system (blocks 14 and 16) forces identification verification for processing, whereas back office requests (block 44) require identification verification in a different manner.

Relationship Pricing by Tier

Via on-line real-time integration of the many systems (block 52) involved in the process, all of the existing customer's accounts are systematically and automatically reviewed during the application session to determine the aggregate balance amount, which gives rise to the best price being offered to the existing customer 10 for the requested credit product. Price includes the handling of both fixed interest rate and variable rate (e.g., indexed rates, such as prime rate plus margin) priced loan types.

Relationship pricing by tier provides the loan applicant 10, i.e., in this case, a new or existing customer, with the least expensive loan rate based upon the applicant's total relationship (i.e., deposit balances) with the financial institution. It also provides the financial institution employees with the appropriate rate for the loan type considering the applicant's relationship with the financial institution. According to the present invention, the system automatically examines an applicant's existing accounts as well as newly deposited funds. The automation of the selection of the appropriate rate solves the problem of choosing the correct rate in an environment that is complicated by many rate alternatives and by the depth and complexity of the applicant's pre-existing or newly established relationship with the financial institution. Within a loan product type (such as an unsecured revolving line of credit) there may be as many as four different rates being quoted to an applicant 10; across products, there are dozens of price points—too many to be easily and accurately remembered by LBRs 12 and applicants 10. Furthermore, the price points are determined from several credit worthiness factors including the total amount of money on deposit in the financial institution (where the deposit amount is the sum of the individual balance amounts in potentially multiple accounts).

A series of tables in the application processing system (ACAPS 26) contains the price points for each product that has multiple price points. The tables also provide the name of the characteristic (such as balance amount), the break point(s) (such as less than $1500, greater than or equal to $1500, etc.), and the resulting price(s). Other table values within ACAPS 26 determine whether the automated pricing routines should be used or not used. Assuming the routines are used, ACAPS 26 calls upon another bank system (block 52), which aggregates all of the customer's balances to obtain the aggregated balance amount to be used in conjunction with the pricing tables to determine the price to be offered to the applicant 10. The price so determined, is also carried through to the other bank systems, which eventually house the new loan.

Front-end Pending Process

The front-end pending process of the present invention provides a solution to the problem of the application submission session, which has been initiated but which cannot be completed for one reason or another. For example, the applicant may be missing key information or the applicant may decide that he or she no longer wishes to continue the session (due to time constraints, etc.). Prior to the present invention, the effort that went into initiating the application was wasted (discarded). The process was required to be started all over when the applicant 10 returned. The pending process of the present invention creates a means to save whatever information had been data-entered when it was discovered that the application would not be completed. The saved data can easily be accessed to allow the application to be completed when the applicant 10 is prepared and ready to complete it.

In addition, easy-to-use files and processes permit saving and allow reuse of data from partially completed applications. Additional processes are built surrounding the pending process to help LBRs 12 remember and follow up on incomplete applications. Incomplete applications within the pending process are aged to insure appropriate follow-up (sales or regulatory compliance).

The pending process of the present invention allows an LBR 12 to merely highlight and select a menu option ("Save to Pending File"), which saves all of the data entered during the session. At this point, the data is saved within the front-end environment (blocks 14 and 16) awaiting a future point when the application can be completed. When the applicant 10 returns, any LBR 12 within the financial institution can easily recall the incomplete application via a menu option ("Pending /Conditional"), add any missing information and then transmit the application to the application processing system (ACAPS 26).

Demand Deposit Account (DDA)

The financial institution utilizes a systematic review of an applicant's credit bureau history (blocks 28, 30, 32 and 34) to determine whether or not to offer them a checking account (demand deposit account) type relationship. This evaluation is systematic in nature and affords the financial institution an efficient method of screening potential checking account candidates while holding fraud loss rates down.

All requests for checking accounts (demand deposit accounts) are submitted through a systemic Social Security Number search, a combined financial institution database information search, and a disaster screen, which enables immediate credit worthiness evaluation. This feature provides an efficient methodology for LBRs 12 to identify those applicants 10 to which the LBRs should not offer checking accounts due to unmatched social security numbers or non-existing social security numbers, derogatory credit behavior, etc., unless the LBRs are appropriately entitled to override.

A message on the front-end system (blocks 14 and 16) indicates the results of the credit evaluation. For qualified applications, the LBR 12 is allowed to open checking accounts immediately. For non-qualified applications, the LBR 12 is presented with override screens with appropriate entitlement or rejection options, based on systemic credit criteria.

ACAPS/Bankcard Processing

This feature of the present invention provides a systematic link to the bankcard acquisition process (block 40) for on-line processing of branch sourced bankcard applications. As with the credit application processing discussed earlier, branch derived bankcard applications are subject to response codes (A, B, C or D) reflecting the credit response, as well as Maximum Debt Burden Offer and verification requirements.

This process systematically interfaces with the bankcard acquisition system (block 40) to provide almost instantaneous response to a credit request (including standard disaster screen and automated credit score performed on ACAPS 26, as well as fraud checks, duplicate name processing, and existing card member review performed on the bankcard system 40). The result of systematic processing enables much quicker turn around times and delivery of credit cards for applicant requests, and efficiency gains from the removal of previously paper-intensive bankcard application processing.

Systematic processing directs all branch sourced bankcard applications through the required credit evaluating processes whether the process resides on the bankcard acquisition system (block 40) for existing card member, fraud, SSN search, and duplicate application, or on ACAPS 26, which houses the bankcard credit evaluation process (e.g., disaster screen, credit score, etc.). If a positive response is generated, the message back to the branch will include conditional approval, which would be fulfilled by the "acceptance" of specified amount of credit, which is then systematically conveyed to the bankcard servicing system (blocks 42, 62 and 40) for booking. Reject decisions send appropriate processing information to the bankcard acquisition system 40 for issuance of decline letters. The system also enables the back-office (block 44) to intervene in appeal situations.

Credit Qualified

This feature provides systematic processing of "credit qualified" that enables an LBR 12 to recognize (either by flag/light/offered amount) which applicants 10 surpass initial credit evaluation screens (e.g., disaster screen, credit score, etc.) encouraging them to optimize sales energy toward cross-selling additional credit products since initial systematic evaluation has indicated that the applicant 10 is credit qualified, although still subject to the required verifications. This systematic "credit qualified" process is automatically invoked even if the applicant is not applying for a credit product. Thus, an applicant who has come into the financial institution to open a deposit account will be evaluated by the "credit qualified" process to enable the LBR to recognize a credit qualified prospect.

Systemic credit evaluation via an ACAPS link to the front-end processing system rapidly identifies "credit qualified" applicants, enabling the LBR 12 to immediately identify those applicants 10 that exceed initial credit criteria. The LBR 12 may then maximize cross-sell opportunities with those applicants.

Credit qualification criteria (e.g., disaster screens, credit scores, etc.) will systematically evaluate an applicant's credit worthiness and then determine whether or not a "credit qualified" marker will be displayed on front-end system. This marker may indicate an amount of "credit qualification" or simply indicate to the LBR 12 that the applicant 10 has surpassed the initial credit criteria screens indicating whether or not a lengthy sales session pertaining to credit products is required. The system may also make a specific product recommendation based upon information elements obtained from the applicant during the application session and upon tables that contain products chosen by management. The system has been designed to allow a "credit qualified" offer to be converted to a "credit request" if the applicant 10 desires more credit than that offered to them in a "credit qualified" manner. Systemic switch to a "credit request" re-labels requests and invokes all necessary credit evaluation criteria associated with a standard credit request (e.g., disaster screens, credit scores, debt burden, etc.) and appropriate identification of adverse action reasons if the applicant 10 does not meet the credit request criteria.

Nearest Competitor

Credit processing of the present invention is a unique point of differentiation. The financial institution's liability and credit review/approval process is more comprehensive and provides faster service than other on-line processes. The present invention provides an on-line processing to LBRs 12 and their applicants 10 to input their unsecured liability and credit requests directly on the system without the need for a paper application. Secured applications may receive conditional approval (contingent on required verifications and approvals) prior to receipt of paperwork.

Combined with the one step relationship account opening, applicants 10 can immediately open an entire bank relationship including installment loans, revolving line of credit, and check over-draft protection.

System Overview

The system of the present invention includes a financial network terminal 14 coupled to a front-end processing and communications system 16, which can access a database 17 containing information regarding all existing customers. The front-end processing and communications system 16 is connected to a financial institution external social security number and check writing behavior database (known as Chexsystems), and to the ACAPS Processing System 26, which in turn accesses several other systems. These include the on-line bank data access system 24, the credit bureau system 28, the data access system 36, the bankcard account fulfillment system 40, and the applicants routing/information posting systems 42.

The credit bureau system includes a link to at least the three major credit databases—Equifax 30, Trans Union 32 and TRW 34.

The ACAPS Processing System 26 includes a database 27 that stores existing customer information, such as applications in process, completed verifications requirements, and pending credit qualified offers.

Post on-line credit decision processing is performed by the application routing/information posting system in conjunction with manual back office reviews.

The bankcard account fulfillment system 40 is used for processing bankcard applications.

The data access system 36 is used for obtaining existing bankcard data when processing bankcard applications.

The on-line bank data access system 24 is used to obtain information regarding existing customers. It includes four databases, the global customer information files 17, the real time account transaction/current balance data storage 18, the customer information demographics database 20 and the additional banking transactions database 22.

Figure 40:
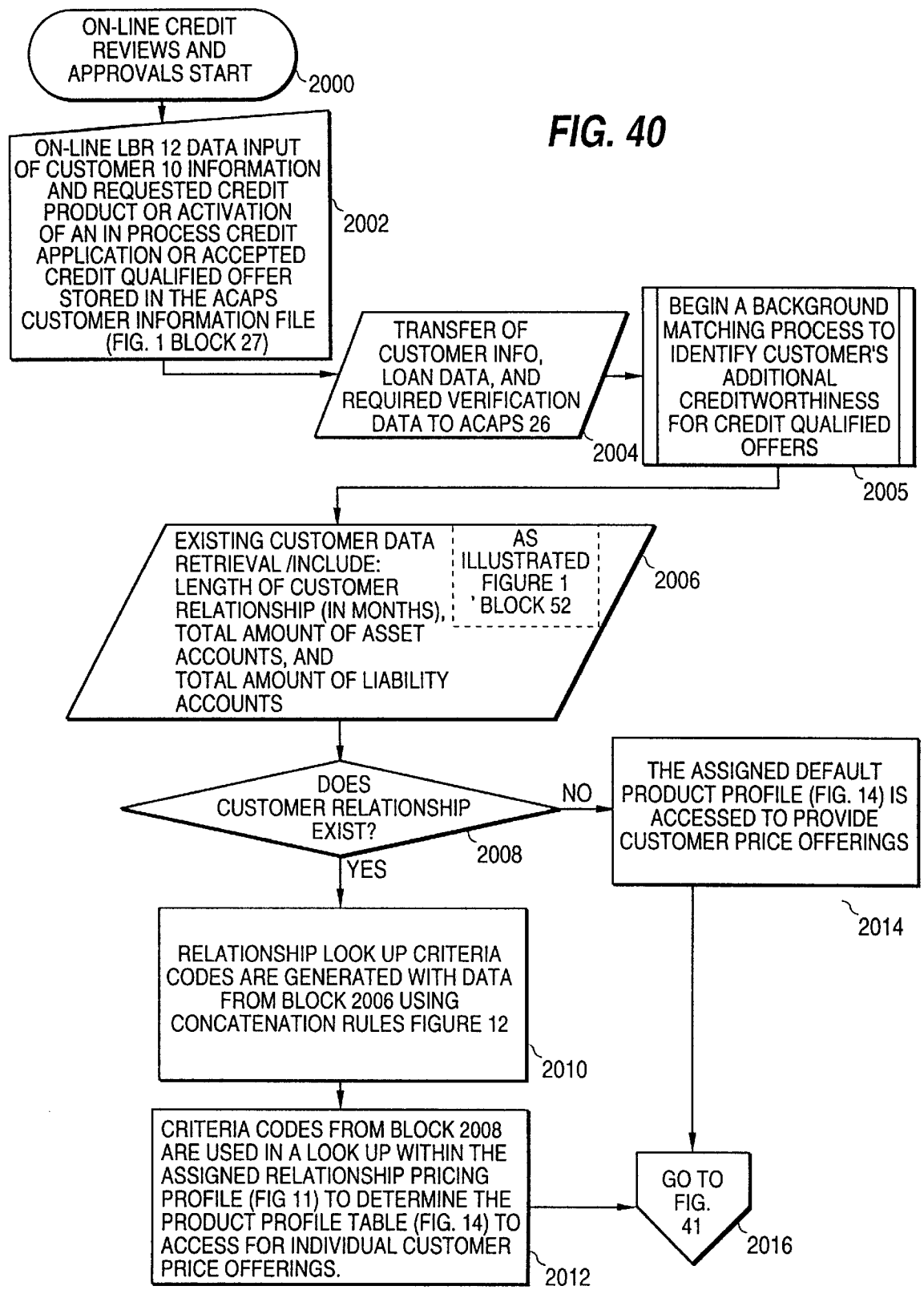
FIG. 40 shows the system initialization diagram for the system and method of the present invention.

The system and method to perform on-line credit reviews and approvals are symbolically flow charted beginning with FIG. 40 at block 2000. The front-end processing system (FIG. 1 blocks 14 and 16) is accessed to fill data entry screens with: (1) the applicant's 10 requested credit product information; (2) an in-process (pending) application; or (3) a credit qualified offer for an applicant 10, which may be activated from the ACAPS customer information file storage (FIG. 1 block 27) for credit decision processing (block 2002).

The entered data (block 2002) is transferred to the enhanced ACAPS 26 (block 2004). This transfer initiates the on-line review and approval decision processing. The system will perform a background matching process to identify an applicant's additional credit worthiness for assignment of credit qualified offers (block 2005).

Using the applicant's 10 information, a look up (as defined by the relationship profile parameter on Product Maintenance 4 screen (FIG. 7 element 20 ), is performed within the bank's on-line data systems (block 2006). The bank's on-line systems consist of real time account transaction and current balance storage (FIG. 1 block 18), existing customer demographics database (block 20) and additional transactions database (block 22). The retrieval access to these existing bank data systems is provided by an on-line access system (block 24). Additional and more complete existing customer relationship data is also retrieved from the global customer information file (block 17). The information gathered from these systems will include the length, in months, of the existing customer's relationship with the financial institution, the total number and dollar amount of asset accounts and the total number and dollar amount of liability accounts. If a customer relationship exists (YES branch from block 2008 ), relationship criteria codes are generated (block 2010) from the customer relationship data using the concatenation rules outlined in FIG. 12. The relationship codes are then used as look up keys within the product assigned relationship pricing profile (shown in FIG. 11) to determine the product profile table (shown in FIG. 14) to be accessed in providing price offers based on an individual customer's existing financial institution relationship.

If no relationship exists (NO branch from block 2008), the assigned default product profile (FIG. 14) is accessed to provide price offers (block 2014).

Figure 41:
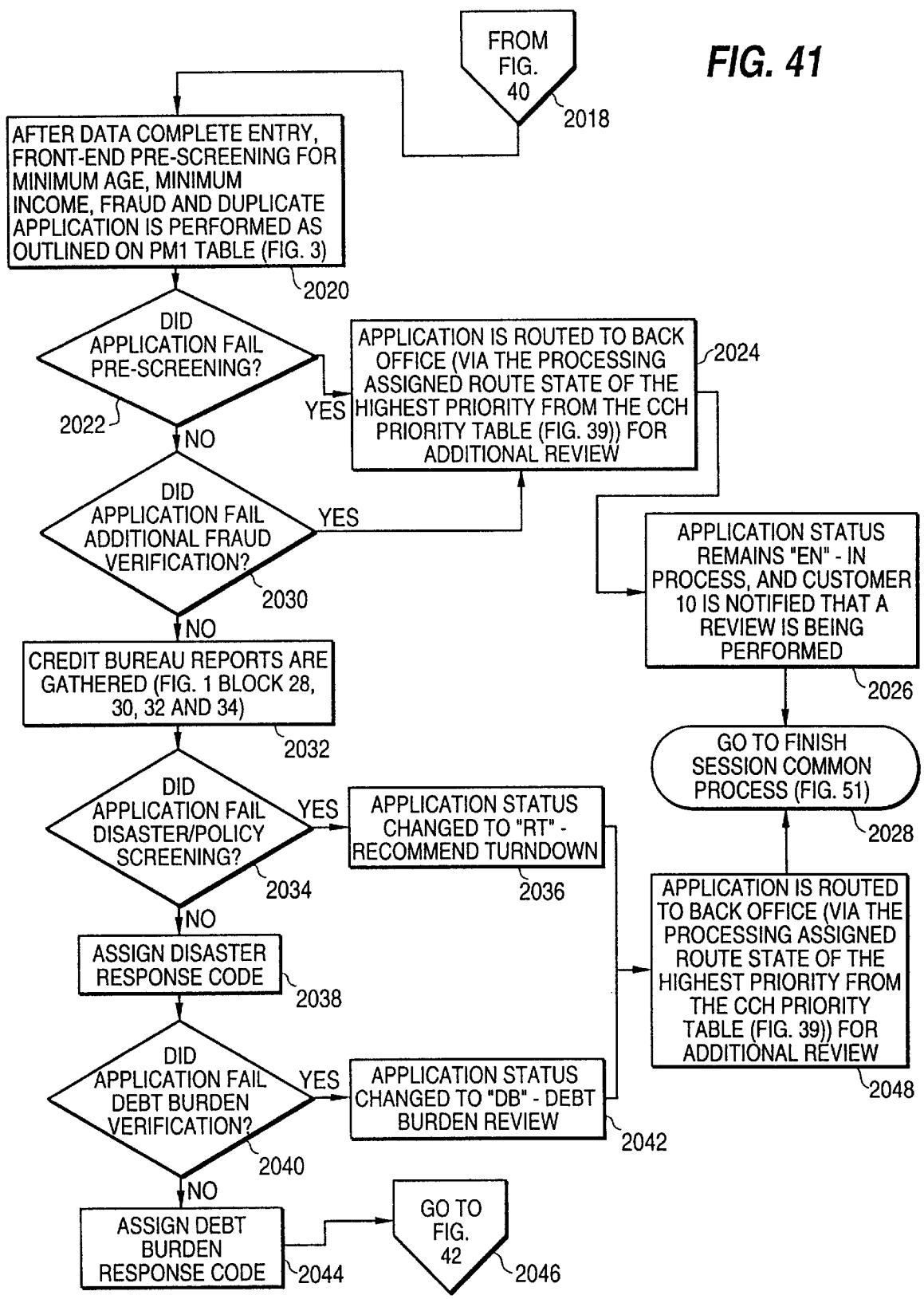
FIG. 41 shows the pre-screening and disaster screening procedure used with the system and method of the present invention.

After entry of all data, front-end pre-screening is performed (FIG. 41 block 2020) for minimum age, minimum income, fraud and duplicate application as configured on the Product Maintenance-1 (PM1) Table (shown in FIG. 3). If the application fails the pre-screening parameters (YES branch from block 2022), it is routed to the back office for additional review (block 2024) using the assigned route state of the highest priority from the CCH priority table (shown in FIG. 39). During back office review, screens showing product and insurance information (PII) (FIG. 18) and income information (INC) (FIG. 20) may be accessed by an underwriter or review personnel as informational displays to assist in the back office credit decision process. The application retains a status of "EN"—In Process, and the applicant 10 is notified that a review is being performed (block 2026). The processing according to the present invention now branches to the finish session process (block 2028).

Figure 51:
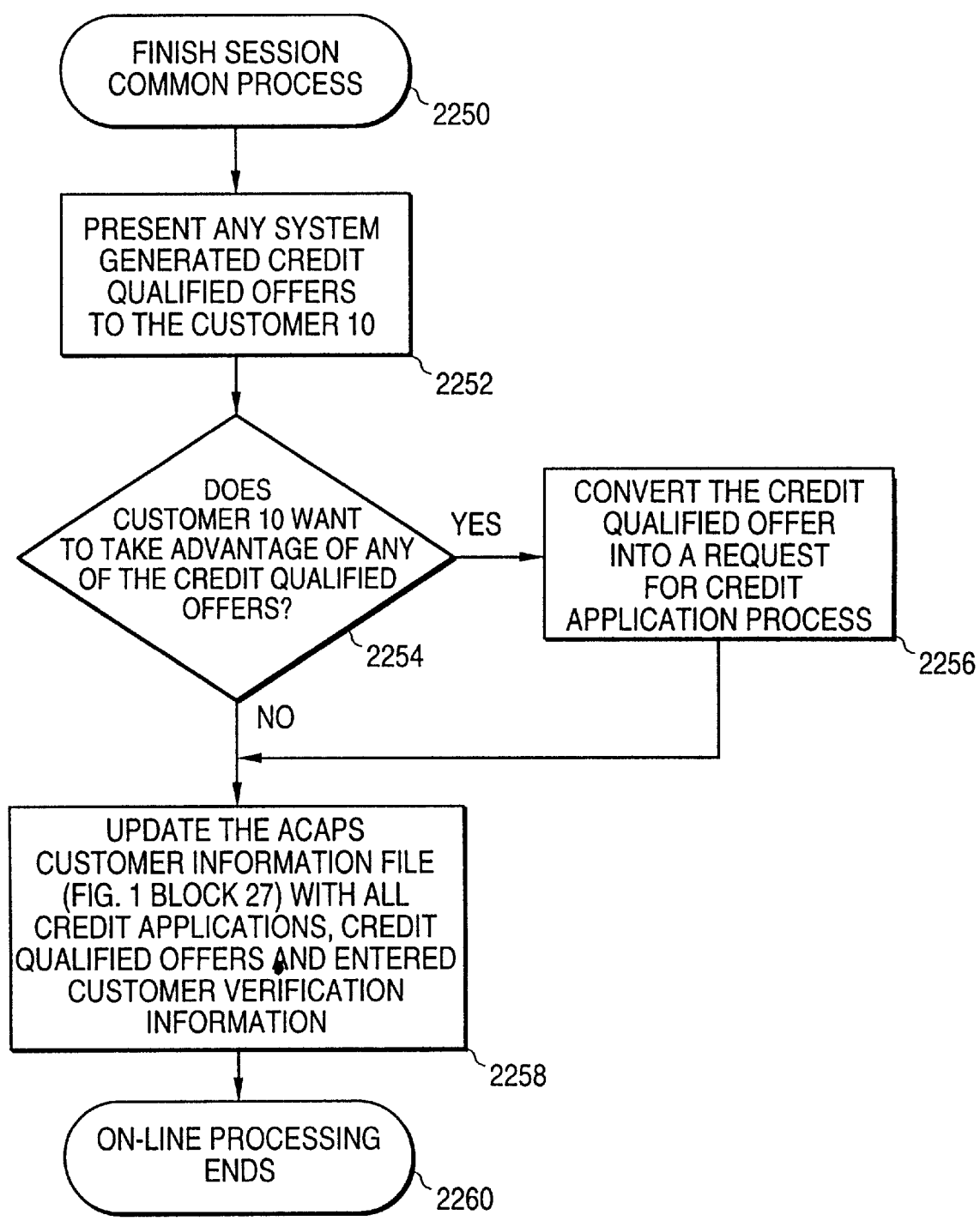
FIG. 51 shows the common process for finishing according to the system and method of the present invention.

The system presents any credit qualified offers that were generated for the applicant 10 and the LBR 12 may now discuss them with the applicant 10 (FIG. 51 block 2252). If the applicant wants to accept any of the offers (Yes branch from block 2252), the credit qualified offer will be converted into a request for credit and will then require on-line credit processing for final decision assignment (block 2256). If the applicant decides not to proceed on an offer (NO branch from block 2254) or after the offer conversion to a request is finished, the ACAPS Customer Information File (FIG. 1 block 27) is updated to store all credit applications, the credit qualified offers, and entered applicant verification information (block 2258). The storage and access to this information are illustrated on the Credit Qualification Panel (QUA) (FIG. 25) and the Customer Information Panel (CIF) (FIG. 30). Use of this information and access to the qualification offers will remain available up to the assigned expiration time limits as defined by the Product Maintenance-9 (PM9) screen (FIG. 22). After the update is complete, processing now ends (block 2260).

Upon passing the pre-screening (NO branch from 2022), the configured fraud verification is performed (block 2030). If the application fails this verification requirement (YES branch from block 2030), the application routing and applicant notification are performed as described above (blocks 2024 and 2026) and processing now branches to the finish session process as illustrated in FIG. 51, described above (block 2028).

Figure 1B:
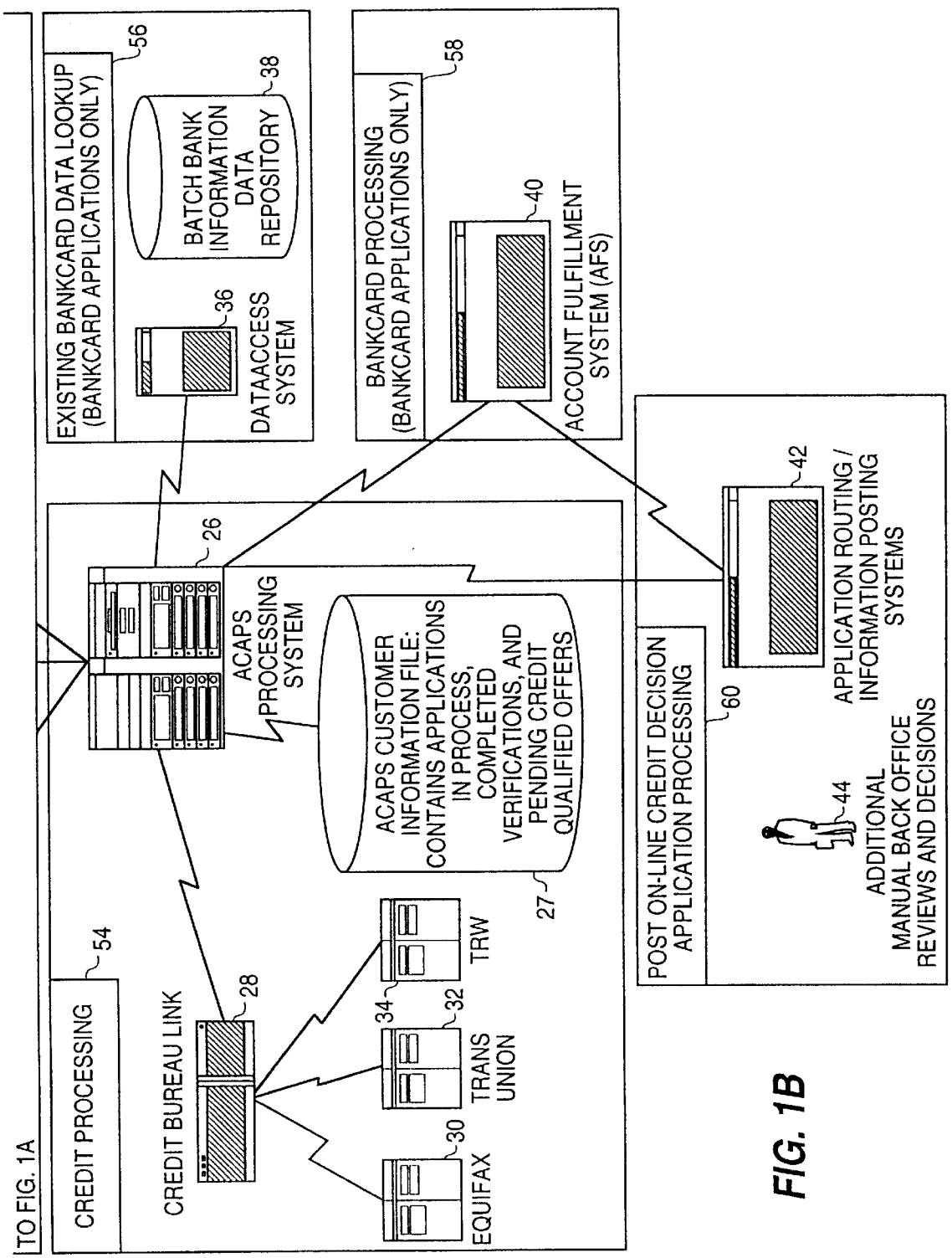

If the fraud verification requirement passes (NO branch from block 2030), credit bureau reports are gathered (block 2032) as illustrated in FIG. 1 blocks 28, 30, 32 and 34.

If configured disaster/policy screening fails (YES branch 55 from block 2034), the application status is changed to "RT"—Recommend Turndown (block 2036) and is then routed to back office review (block 2048) as previously described; then processing branches to the finish session process as illustrated in FIG. 51, described above (block 2028). Upon passing the disaster/policy screening (NO branch from block 2034), a disaster response code is determined and assigned to the application (block 2038).

If configured debt burden verification requirement fails (YES branch from block 2040), the application status is changed to "DB"—Debt Burden Review (block 2042) and is then routed to back office review (block 2048) as previously described; then review processing branches to the finish session process as illustrated in FIG. 51, described above (block 2028). Upon passing the debt burden verification requirement (NO branch from block 2040), a debt burden response code is determined and assigned to the application (block 2044).

Figure 42:
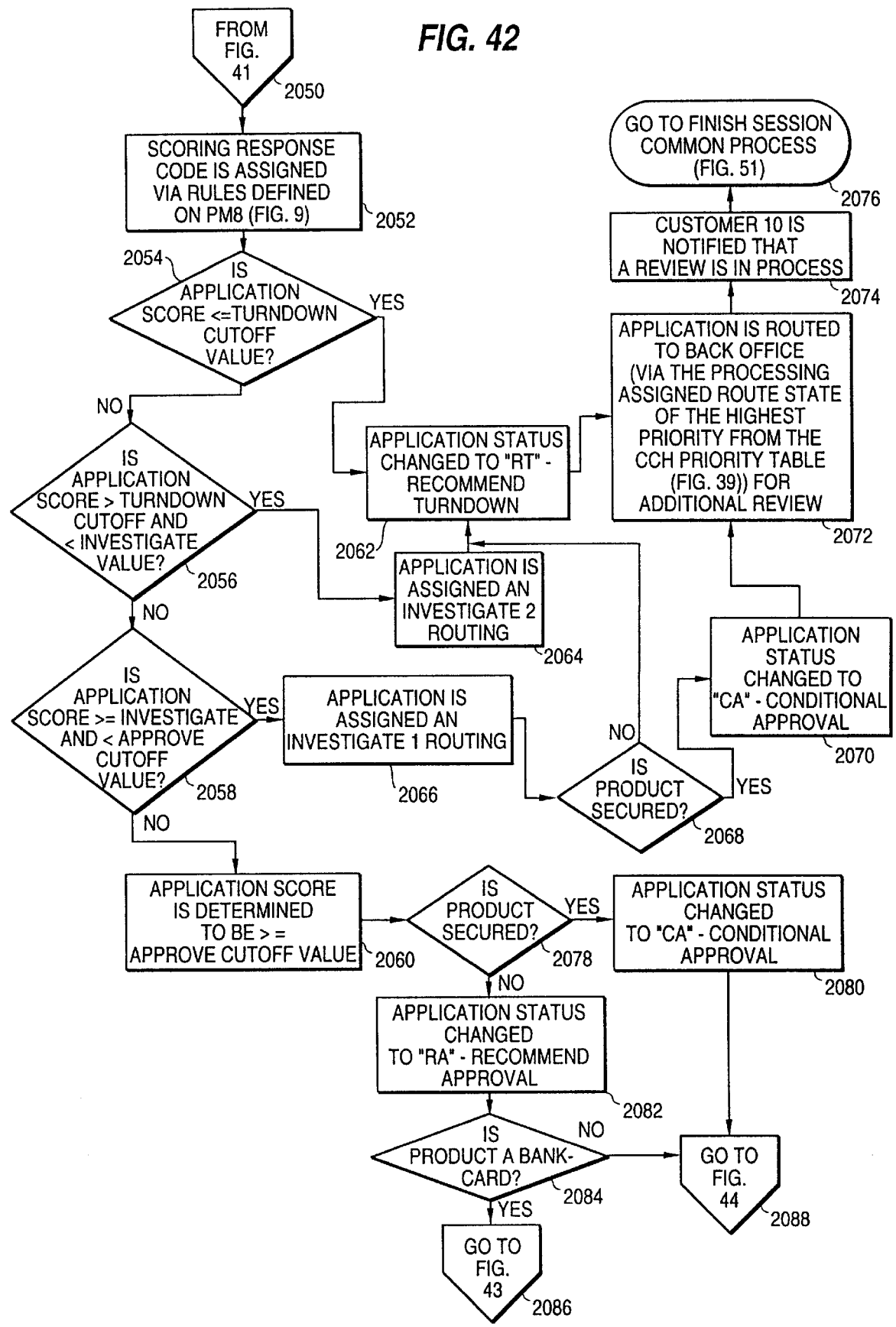
FIG. 42 shows the first application score evaluations used with the system and method of the present invention.

Using parameters and rules configured on Product Maintenance-8 (PM8) (shown in FIG. 9), a scoring response code is assigned to the application (FIG. 42 block 2052). If this score is less than or equal to the turndown cutoff value (YES branch from block 2054), the application status is changed to "RT"—Recommend Turndown (block 2062) and is then routed to back office review (block 2072) as previously described; then the applicant 10 is notified that a review is in process (block 2074) and processing branches to the finish session process as illustrated in FIG. 51, described above (block 2076).

If the application score is greater than turndown cutoff and less than investigate value (YES branch from block 2056), an Investigate 2 Routing is assigned to the application (block 2064), the application status is changed to "RT"—Recommend Turndown (block 2062) and is then routed to back office review (block 2072) as previously described; then the applicant 10 is notified that a review is in process (block 2074) and processing branches to the finish session process as illustrated in FIG. 51, described above (block 2076).

If the application score is greater than or equal to the investigate value and less than the approve cutoff value (YES branch from block 2058), an Investigate 1 Routing is assigned to the application (block 2064). If the product is a secured product (YES branch from block 2068), the application status is changed to "CA"—Conditional Approval (block 2070 ); otherwise (NO branch from block 2068) the application status is changed to "RT"—Recommend Turndown (block 2062). The application is now routed to back office review (block 2072) as previously described; then the applicant 10 is notified that a review is in process (block 2074) and processing branches to the finish session process as illustrated in FIG. 51, described above (block 2076).

If the above three tests fail (NO branch from blocks 2054,2056 and 2058), the application score is determined to be greater than or equal to the approve cutoff value (block 2060). If the product is a secured product (YES branch from block 2078), the application status is changed to "CA"—Conditional Approval (block 2080 ); otherwise (NO branch from block 2078) the application status is changed to "RA"—Recommend Approval (block 2082).

Figure 43:
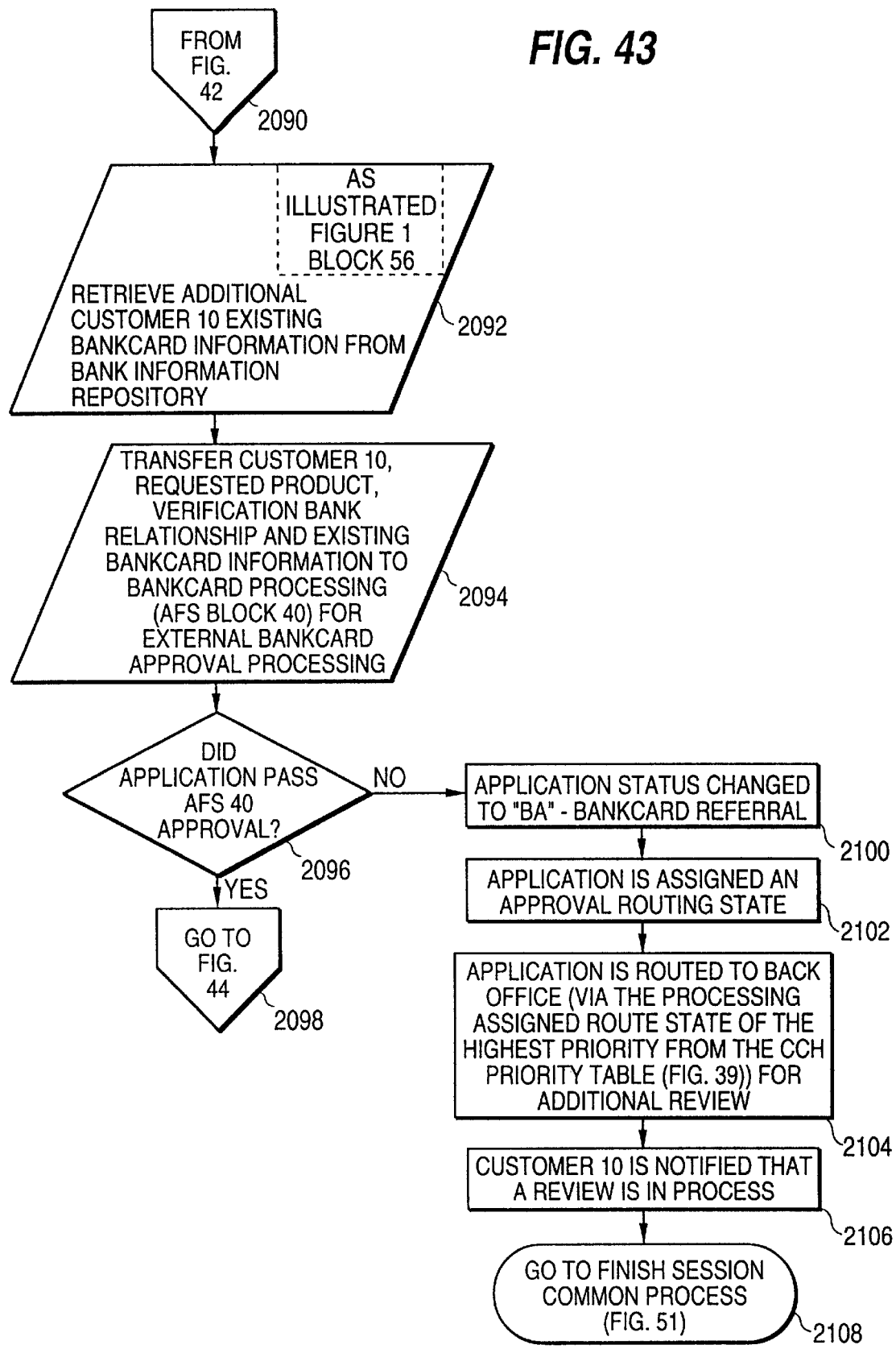
FIG. 43 shows the processing for a bankcard application according to the system and method of the present invention.

If the product is a bankcard (YES branch from block 2084), the batch data repository (FIG. 1 block 56) is accessed to retrieve addition bankcard information for the applicant 10 (FIG. 43 block 2092). All data entered and electronically gathered applicant and requested product information is transferred to the bankcard account fulfillment system (shown in block 40 FIG. 1) for bankcard processing system approval (block 2094). If the application does not receive a "PASS" indication from the bankcard account fulfillment system 40 (NO branch from block 2096), the application status is changed to "BA"—Bankcard Referral (block 2100), is assigned an approval routing state (block 2102) and is then routed to back office review (block 2104) as previously described; then the applicant 10 is notified that a review is in process (block 2106) and processing branches to the finish session process as illustrated in FIG. 51, described above (block 2108).

Figure 44:
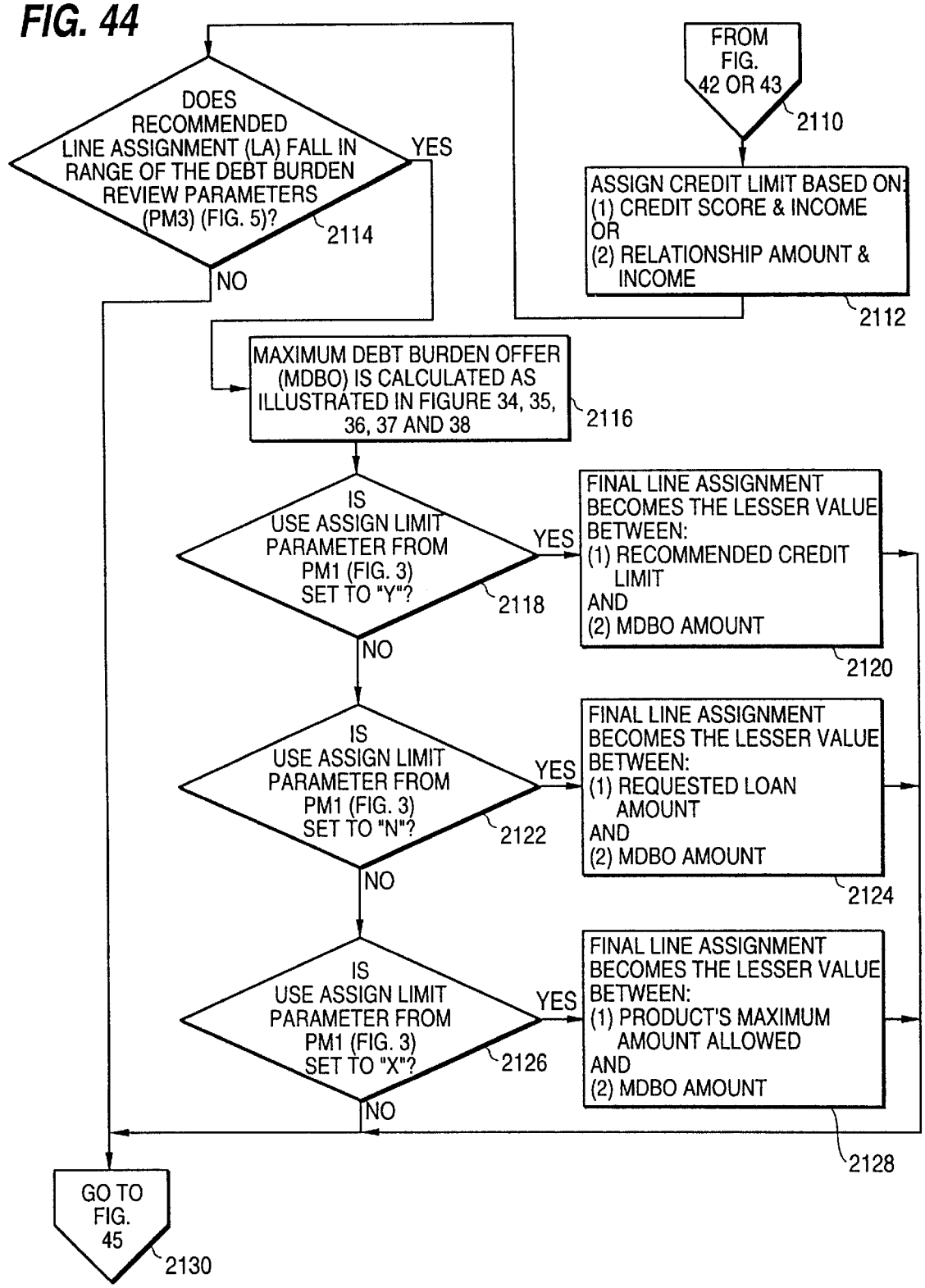
FIG. 44 shows a diagram of the credit limit and Maximum Debt Burden Offer assignment used with the system and method of the present invention.

For applications still active in the review and approval process, the requested product is assigned a credit limit amount based upon either the application credit score and applicant income or the applicant's bank relationship amount and income, if any, (FIG. 44 block 2112).

If the recommended line assignment amount is in the range indicated on Product Maintenance-3 (PM3, FIG. 5) for debt burden review (YES branch from block 2114), a Maximum Debt Burden Offer (MDBO) is calculated (block 2116) as documented in FIG. 34 with examples of usage in FIGS. 35, 36, 37 and 38. If the Use Assign Limit parameter of PM1 (FIG. 3) is set to "Y" (YES branch from block 2118), the final line assignment is the lesser of the recommended credit limit and the MDBO amount (block 2120). If the Use Assign Limit parameter of PM1 (FIG. 3) is set to "N" (YES branch from block 2122), the final line assignment is the lesser of the requested loan amount and the MDBO amount (block 2124). If the Use Assign Limit parameter of PM1 (FIG. 3) is set to "X" (YES branch from block 2126), the final line assignment is the lesser of the product's maximum allowed amount and the MDBO amount (block 2128).

Figure 45:
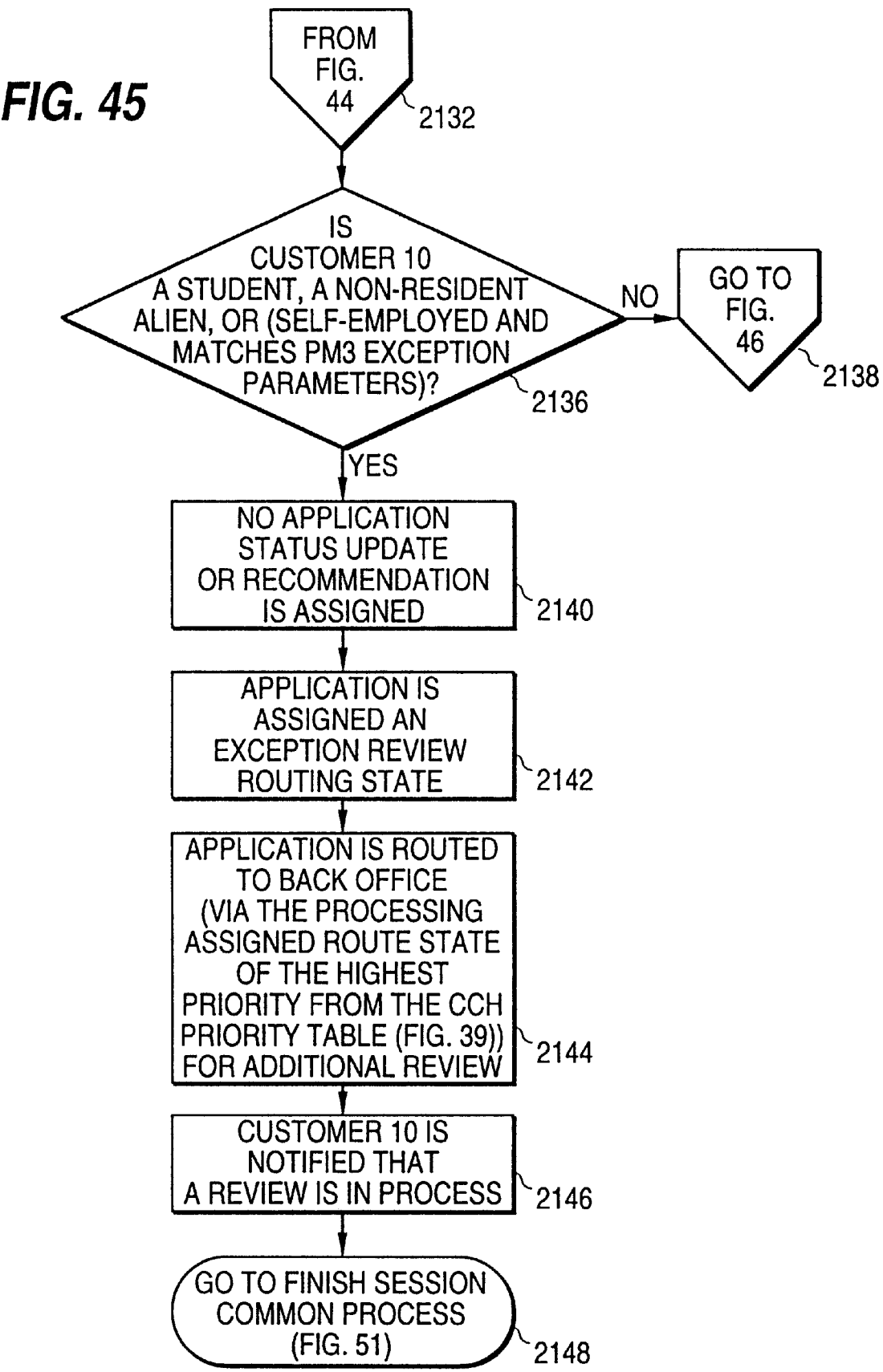
FIG. 45 shows additional criteria evaluation used with the system and method of the present invention.

If the applicant 10 is a student, a non-resident alien or self-employed and meets the exception parameters on PM 3 (FIG. 5) (YES branch from FIG. 45 block 2136), the application status is not updated (block 2140), is assigned an exception review routing state (block 2142) and is then routed to back office review (block 2144) as previously described; then the applicant 10 is notified that a review is in process (block 2146) and processing branches to the finish session process as illustrated in FIG. 51, described above (block 2148).

Figure 46:
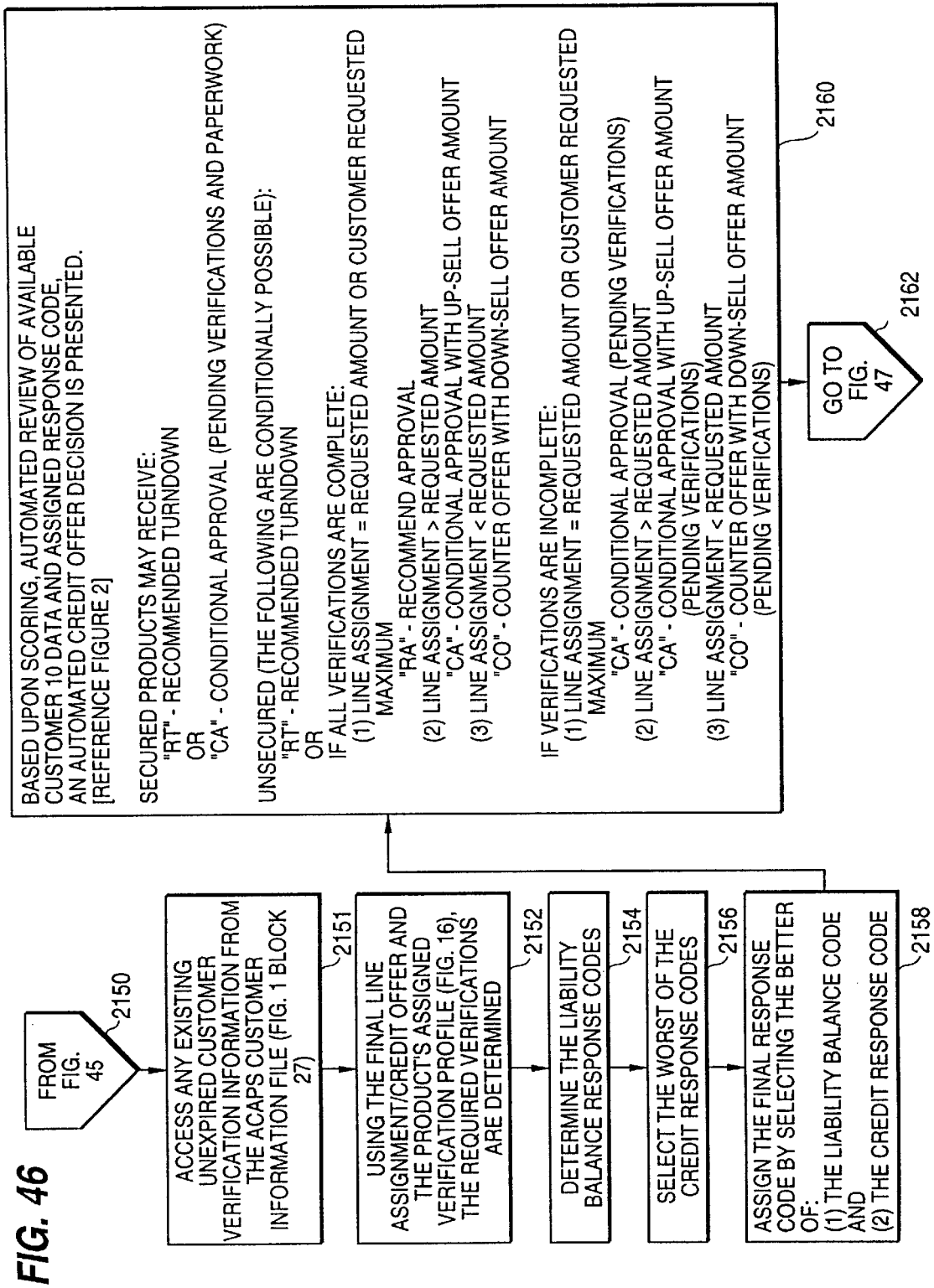
FIG. 46 shows the applicant required verifications and automated response generation produced by the system and method of the present invention.

If the applicant 10 does not match the above parameters (NO branch from block 2136), application processing will continue. Existing customer verification data (stored in the ACAPS Customer Information File as shown in the Customer Information Panel, FIG. 30) are retrieved and validated for use by comparison of expiration time limits set in the Product Maintenance-9 screen (PM9, FIG. 22). The final line assignment/credit offer and the product assigned verification profile (shown in FIG. 16) are used to determine the required verifications (FIG. 46 block 2152).

Next, a bank liability balance response code is assigned (block 2154). Next, the worst of the credit response codes is selected (block 2156). The final response code is assigned to the application (block 2158) by selecting the better of the liability balance code and the credit response code.

Based upon the application score, the automated review of applicant 10 data and the assigned response code, an automated credit offer decision is presented (block 2160). This credit offer decision is a table driven response from the Decision and Ranking Codes chart as illustrated in FIG. 2. If the product is secured, a decision of "RT"—Recommend Turndown or "CA" Conditional Approval (pending required verifications and paperwork) may be assigned. If the product is unsecured, the following decisions may be assigned: "RT"—Recommend Turndown, "RA"—Recommend Approval, "CA"—Conditional Approval, or "CO"—Counter Offer.

Figure 47:
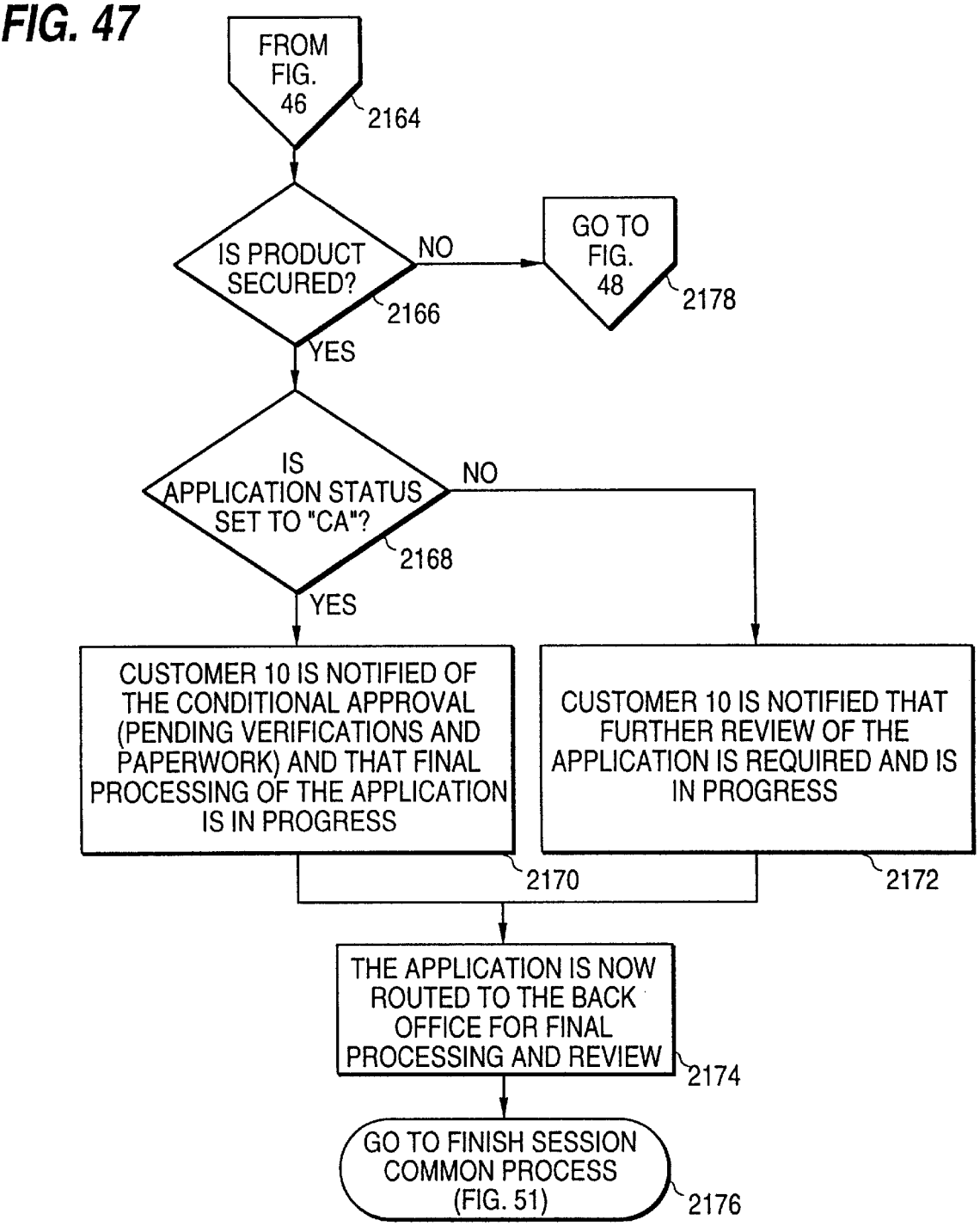
FIG. 47 shows special handling for a secured credit product according to the system and method of the present invention.

If the product is secured (YES branch from FIG. 47 block 2166), the assigned status is tested (block 2168). If the application status is set to "CA" (YES branch from block 2168), the applicant 10 is notified of the conditional approval and that final processing of the application is in progress (block 2170). If the status is "RT" (NO branch from block 2168), the applicant 10 is notified that further review of the application is required and is in progress (block 2172). The application is now routed to the back office for final processing and review (block 2174). Processing now branches to the finish session process as illustrated in FIG. 51, described above (block 2176).

Figure 48:
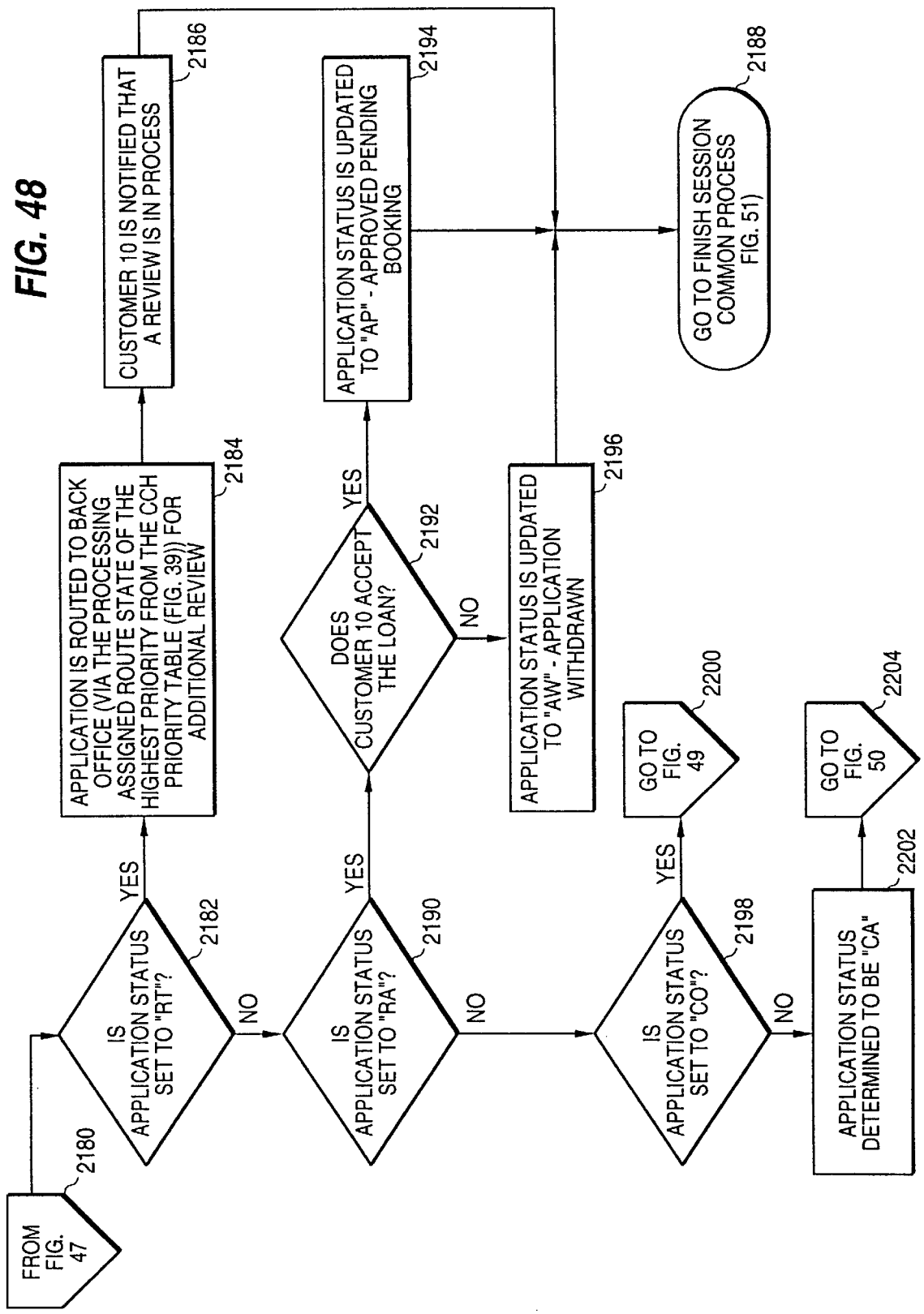
FIG. 48 shows the applicant offer presentation and response evaluation process according to the system and method of the present invention.

If the product is unsecured (NO branch from block 2166), the application status is tested (FIG. 48 blocks 2182, 2190, 2198 and 2202). If the status is "RT" (YES branch from block 2182), the application is routed to back office review (block 2184) as previously described. The applicant 10 is notified that a review is in process (block 2186). Processing now branches to the finish session process as illustrated in FIG. 51, described above (block 2188).

If the status is "RA" (YES branch from block 2190), the applicant 10 is presented with the loan offer and asked to accept or reject the offer (block 2192). If the applicant 10 accepts the loan (YES branch from block 2192), the application status is updated to "AP"—Approved Pending Booking (block 2194 ); otherwise (NO branch from block 2192), the status is updated to "AW"—Application Withdrawn (block 2196). Processing now branches to the finish session process as illustrated in FIG. 51, described above (block 2188).

Figure 49:
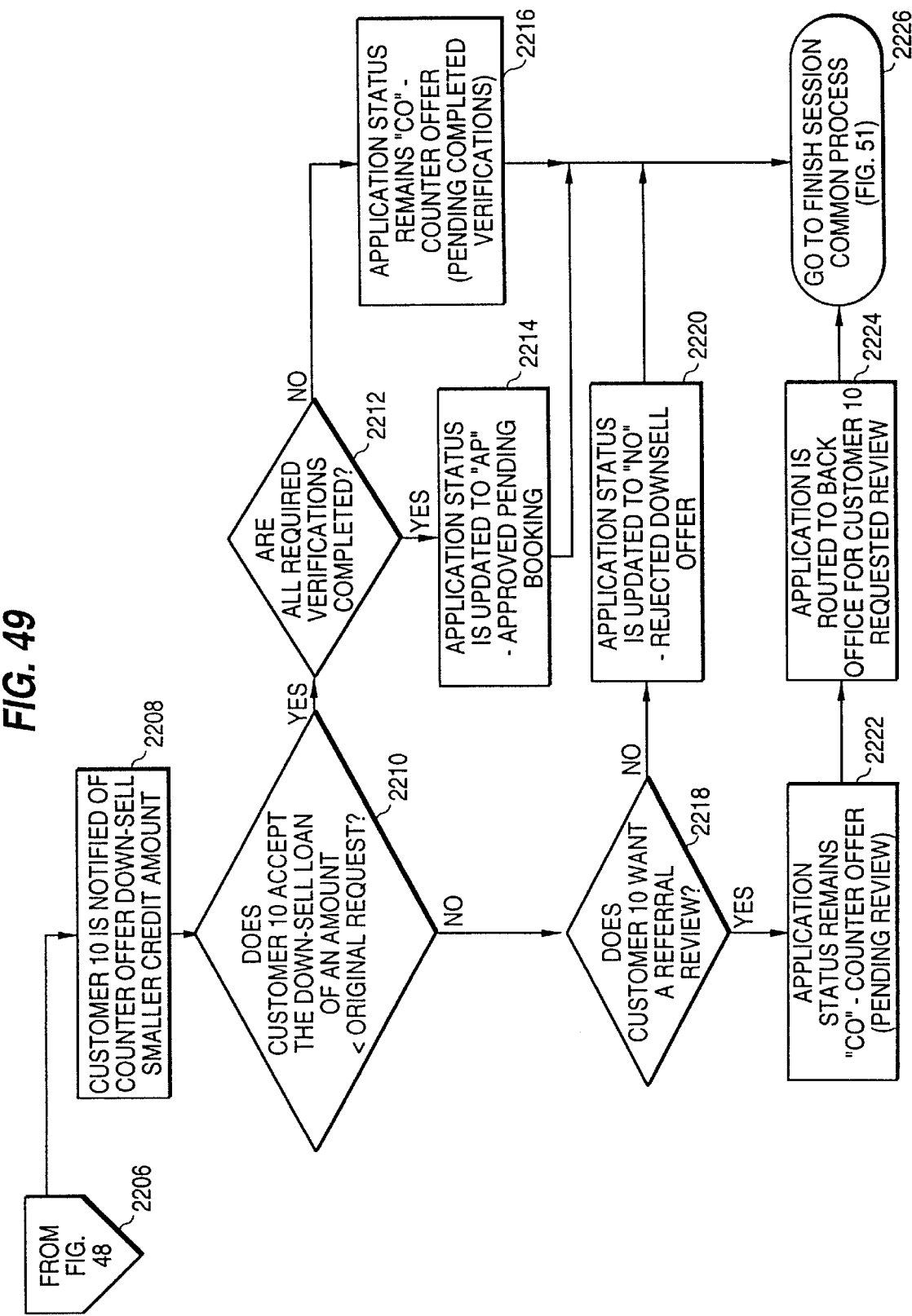
FIG. 49 shows counter offer down-sell offer for a lessor credit amount process according to the system and method of the present invention.

If the status is "CO" (YES branch from block 2198), the applicant 10 is notified of the counter offer down-sell smaller credit amount (FIG. 49 block 2208). If applicant 10 accepts the down-sell loan amount (YES branch from block 2210), required verifications are tested for completeness (block 2212). If verifications requirements are complete (YES branch from block 2212), the application status is updated to "AP"—Approval Pending Booking (block 2214). If required verifications are incomplete (NO branch from block 2212), the application status is updated to "CO"—Counter Offer (pending required verifications) (block 2216). If the applicant 10 rejects the offer (NO branch from block 2210), the applicant may ask for a referral review (block 2218). If they do not want a review (NO branch from block 2218), the application status is updated to "NO"—Rejected Downsell Offer (block 2220). If they do want a review (Yes branch from block 2218), the application status remains "CO"—Counter Offer (pending review) (block 2222 ); then the application is routed to the back office for applicant 10 requested review (block 2224). Processing now branches to the finish session process as illustrated in FIG. 51, described above (block 2226).

Figure 50:
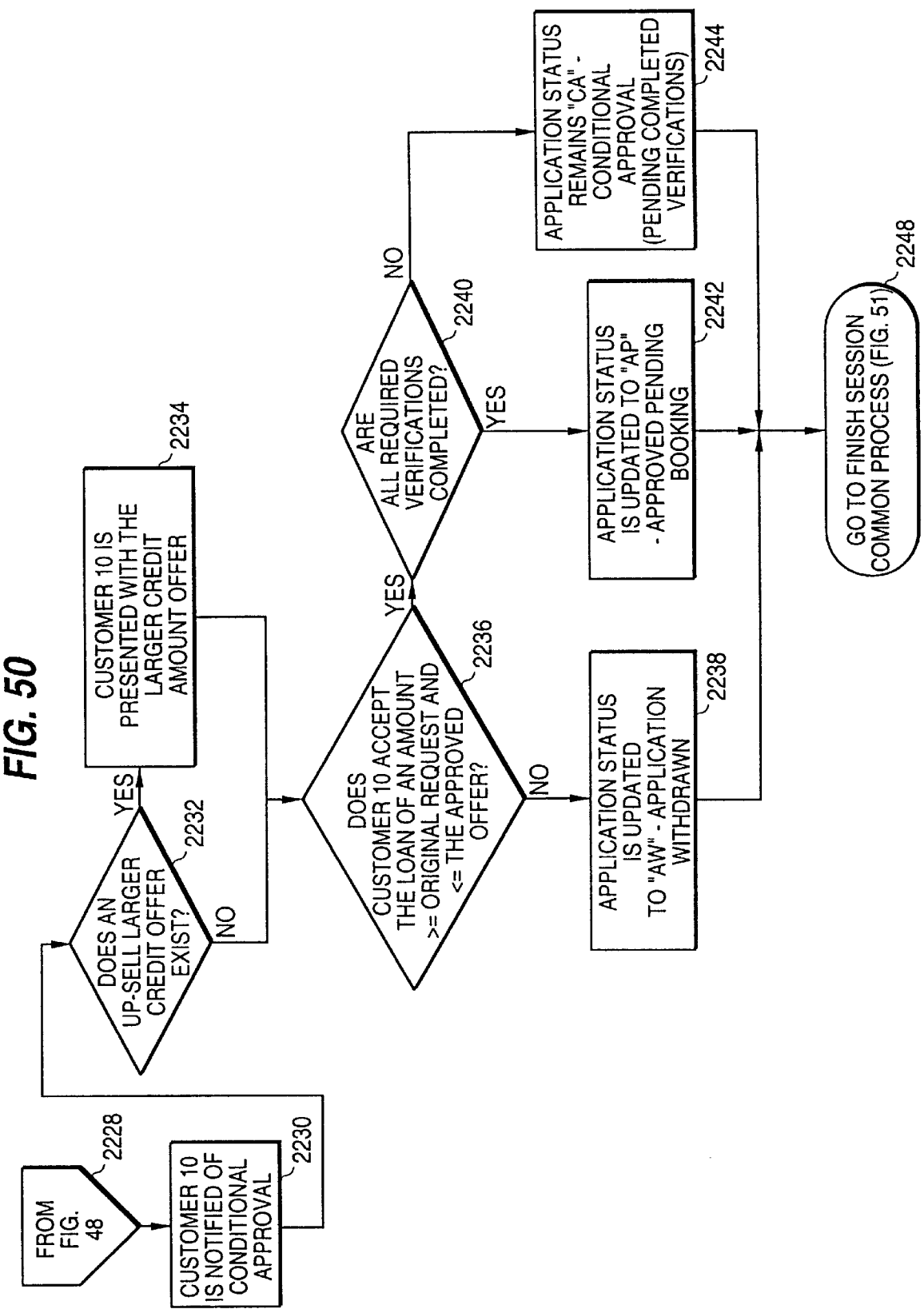
FIG. 50 shows up-sell offer or a larger credit offer process according to the system and method of the present invention.

The application status is determined (block 2202) to be "CA" (NO branch from blocks 2182, 2190 and 2198). The applicant 10 is notified of the conditional approval (FIG. 50 block 2230). If an up-sell larger credit offer exists (YES branch from block 2232), the applicant 10 is presented with the larger amount offer (block 2234). The applicant 10 is now asked if they accept the loan offer for an amount in the range from the original request to the approved offer (block 2236). If the applicant 10 accepts the offer (YES branch from block 2236), required verifications are tested for completeness (block 2240). If required verifications are complete (YES branch from block 2240), the application status is updated to "AP"—Approval Pending Booking (block 2242). If required verifications are incomplete (NO branch from block 2240), the application status remains "CA"—Conditional Approval (pending required verifications) (block 2244). If the applicant 10 rejects the offer (NO branch from block 2236), the application status is updated to "AW"—Application Withdrawn (block 2238). Processing now branches to the finish session process as illustrated in FIG. 51, described above (block 2248).

Although the invention has been described in detail with particular reference to a preferred embodiment thereof, it should be readily understood that the invention may be capable of other and different tasks. As is readily apparent to persons having ordinary skill in the art, variation and modifications can be made while remaining within the spirit and scope of the invention. Therefore, the foregoing disclosure and drawing figures are for illustrative purposes only, and do not in any way limit the invention, which is defined by the appended claims.

What is claimed is:

1. A method for performing an automatic on-line review of an applicant's application for a product or service offered by a financial institution, in real-time, comprising the steps of:
   a) receiving a first set of data into a data processing and communication system, said data relating to information provided by said applicant;
   b) receiving a second set of data into said data processing and communication system, said second set of data relating to the product or service requested by said applicant; and
   c) using said first data to access at least one database internal to said financial institution to evaluate the existing assets and liabilities said applicant has at said financial institution and generating on a real time basis a relationship profile for said applicant, said relationship profile being based upon at least an amount of assets and liabilities said applicant currently has with the financial institution.

2. The method according to claim 1, further comprising the steps of:
   d) generating a category representing said relationship profile, said relationship profile being based upon at least an amount of assets and liabilities said applicant currently has with the financial institution; and
   e) using said category to set a price based on said category from a product profile table, said table containing information regarding prices for products or services offered by the financial institution.

3. The method according to claim 2, further comprising the step of:
   f) comparing said first data and said relationship profile against a pre-screening criteria to determine whether or not said prescreening criteria has been met, said pre-screening criteria including said customer's income; and
   g) routing an applicant's application that fails to meet said prescreening criteria to a manual review.

4. The method according to claim 1, further comprising the steps of:
   d) performing a fraud verification on said first set of data using information within said financial institution including a review of a fraud file internal to said financial institution;
   e) in addition to said performing step (d) above, gathering credit reports from at least one credit bureau using said first set of data, and comparing said credit reports against a minimum disaster/policy criteria.

5. The method according to claim 4, further comprising the step of:
   f) routing an applicant's application that fails to meet said disaster/policy criteria to a manual review.

6. The method according to claim 4, further comprising the steps of:
   e) comparing said applicant's application score against an approved cutoff value; and
   f) referring an applicant's application that fails to meet said approval cutoff value to a manual review.

7. The method according to claim 1, further comprising the steps of:
   d) accessing a social security database to perform a social security number screen using information from the first set;
   e) accessing a credit bureau using said first set of data; and
   f) applying a minimum disaster/policy screen against the first and second set of data.

8. The method according to claim 1, further comprising the steps of:
   d) assigning a credit limit amount to said applicant;
   e) determining if requested loan amount is within the limits of the product maintenance file; and then
   f) approving disbursement of funds to said applicant.

9. The method of claim 1 wherein said assets include assets being deposited by said applicant at the time the review is performed.

10. A computer system for processing an application by an applicant for a product or service offered by a financial institution, comprising programming to perform the following processes:
    a) evaluating the application according to predetermined operating policies, ranking the application according to a predetermined scoring and immediately conveying an evaluation status to a local branch representative;

b) providing to the local branch representative a maximum allowable amount of credit for the application in response to a request for a particular product, wherein an estimated payment for the particular product, in addition to all known debt of the applicant, including applicant provided debt and credit bureau provided debt, would not exceed stored product specified parameters up to a designated controlling debt burden;

c) providing the local branch representative with a systematic identification of verification categories required based on an amount offered and accepted, and enabling the local branch representative to select a methodology of completing the required verifications, and preventing booking of the application unless all required verifications are completed;

d) automatically reviewing all of the applicant's accounts when reviewing the credit to determine an aggregate balance amount that gives rise to a best price for offering to the applicant for the requested product, wherein said computer includes a series of tables that contain a plurality of price points for each product to perform said determination; and e) maintaining an incomplete application on the system in a format that permits completion of the application at a later date by any local branch representative, and providing a prompt to the local branch representative to encourage follow up of an incomplete application based on an automatic aging of an incomplete application.

11. The system according to claim 10, wherein the programming further comprises the additional process of:

f) performing a review of an applicant's credit history to determine whether or not to offer the applicant a demand deposit account type relationship.

12. The system according to claim 10, wherein the programming further comprises the additional process of:

f) providing a link to a bankcard acquisition process for on-line processing of bankcard applications.

13. The system according to claim 10, wherein the programming further comprises the additional process of:

f) identifying credit qualified applicants to the local branch representative, wherein credit qualified applicants are those applicants that surpass initial credit evaluation screens.

14. The system according to claim 10, wherein said verification categories include at least one selected from the group consisting of: identification, telephone number, employment, and income.

15. The system according to claim 10, wherein said verification categories includes information about an applicant relating to the applicant's capacity, character, collateral and credit.

16. An apparatus for processing applications for products or services offered by a financial institution, comprising:

a) a processing system including a plurality of first data links, accessing a plurality of on-line credit bureaus external to the financial institution via one of the plurality of first data links, accessing a bankcard processing system external to the financial institution via one of the first plurality of data links, accessing a bankcard data access system external to the financial institution storing information regarding existing bankcards via one of said plurality of first data links, and storing credit applications in process, completed and verified credit applications, and pending credit qualified offers, and;

b) a front-end processing and communications system including a terminal for inputting data regarding an applicant, being linked with said credit processing system via one of said plurality of first data links, and having a first dedicated data link;

c) an on-line data access system being linked with said processing system via one of said plurality of first data links, being linked with said front-end processing and communications system via said first dedicated data link, and including a plurality of databases storing information regarding all applicants of the financial institution, account information, applicant demographic information and banking transactions; and d) a decision application processing system being linked with said processing system via one of said plurality of first data links, including a second dedicated data link for accessing the bankcard processing system, and routing credit applications to manual review upon rejection of the application by the apparatus.

17. The apparatus according to claim 16, wherein said processing system evaluates the application according to predetermined credit policies, ranks the application according to a predetermined scoring and immediately conveys a credit evaluation status to the front-end processing and communications system for display on the terminal to a local branch representative.

18. The apparatus according to claim 16, wherein said processing system provides the front-end processing system for display on the terminal to a local branch representative with a maximum allowable amount of credit for the application in response to a request for a particular product, and wherein an estimated payment for the particular product, in addition to all known debt of the applicant does not exceed stored product specified parameters up to a designated controlling debt burden.

19. The apparatus according to claim 18, wherein said processing system automatically reviews all of the applicant's accounts, including both existing and newly established accounts, when reviewing the application to determine an aggregate balance amount which gives rise to a best price for offering to the applicant for the requested product, and during said review accesses a series of tables that contain a plurality of price points for each product to perform said determination, and provide said front-end processing and communications system with said best price for display on said terminal to a local branch representative.

20. The apparatus according to claim 18, wherein said processing system maintains an incomplete application in a format that permits completion of the application at a later date, and provides said incomplete application to said front-end processing and communications system in response to a request from the front-end processing and communications system.

21. The apparatus according to claim 20, wherein said processing system provides a prompt to the front-end processing and communications system for display on the terminal to a local branch representative to encourage follow up of an incomplete application based on an automatic aging of an incomplete application.

22. The apparatus according to claim 16, wherein said processing system provides the front-end processing system for display on the terminal to a local branch representative with a systematic identification of verification categories required based on an amount offered and accepted, and enabling the local branch representative to select a methodology of completing the required verifications, and preventing booking of the application unless all required verification are completed.

23. The apparatus according to claim 22, wherein said required verifications include at least one selected from the group consisting of: identification, telephone number, employment, and income.

24. The apparatus according to claim 22, wherein said required verifications include information about a credit applicant relating to the credit applicant's capacity, character, collateral and credit.

25. A method for performing an automatic on-line review of an applicant's application for a product or service offered by a financial institution, in real-time, comprising:

receiving a first set of data into a data processing and communication system, said data relating to information provided by said applicant;

receiving a second set of data into said data processing and communication system, said second set of data relating to the product or service requested by said applicant;

using said first data to identify on a real time basis a relationship profile with said applicant, said relationship profile being based upon an amount of assets and liabilities said applicant has with the financial institution;

performing a fraud verification on said first set of data;

gathering credit reports from at least one credit bureau using said first set of data, comparing said credit reports against a minimum disaster/policy criteria;

assigning a disaster response code to said first set of data;

preparing a debt burden value based upon said credit report and said first set of data; and comparing said debt burden value against a debt burden table parameter.

26. A method for performing an automatic on-line review of an applicant's application for a product or service offered by a financial institution, in real-time, comprising:

receiving a first set of data into a data processing and communication system, said data relating to information provided by said applicant;

receiving a second set of data into said data processing and communication system, said second set of data relating to the product or service requested by said applicant;

using said first data to identify on a real time basis a relationship profile with said applicant, said relationship profile being based upon an amount of assets and liabilities said applicant has with the financial institution;

performing a fraud verification on said first set of data;

gathering credit reports from at least one credit bureau using said first set of data, comparing said credit reports against a minimum disaster/policy criteria;

determining a debt burden code and assigning said code to said applicant's application and assigning a scoring response code to said applicant's application; and comparing said scoring response code to a turndown cutoff value.

* * * * *